United States Patent
Harris et al.

(10) Patent No.: US 8,226,738 B2
(45) Date of Patent: Jul. 24, 2012

(54) WIRE FILTER CAGE LOCKING MECHANISM

(75) Inventors: Michael Harris, Ramsey, MN (US); Kal Ugargol, Minneapolis, MN (US); Howard Pipkorn, Soderville, MN (US); John Johnson, Eden Prairie, MN (US)

(73) Assignee: Air-Cure Incorporated, Minneapolis, MN (US)

( * ) Notice: Subject to any disclaimer, the term of this patent is extended or adjusted under 35 U.S.C. 154(b) by 233 days.

(21) Appl. No.: 12/781,069

(22) Filed: May 17, 2010

(65) Prior Publication Data

US 2011/0277428 A1 Nov. 17, 2011

(51) Int. Cl.
*B01D 46/02* (2006.01)

(52) U.S. Cl. .......................... 55/379; 55/492

(58) Field of Classification Search ............ 55/379, 55/341.1, 377, 378, 492, 496, 507, 509; 210/232, 210/323.2, 346, 486
See application file for complete search history.

(56) References Cited

U.S. PATENT DOCUMENTS

| | | | |
|---|---|---|---|
| 3,131,044 A | 4/1964 | Springer | |
| 3,295,687 A | 1/1967 | Schmerler | |
| 3,360,910 A | 1/1968 | Soltis | |
| 3,385,034 A | 5/1968 | Farr | |
| 3,550,359 A | 12/1970 | Fisher et al. | |
| 3,680,285 A | 8/1972 | Wellan et al. | |
| 3,747,307 A | 7/1973 | Peshina et al. | |
| 3,884,659 A | 5/1975 | Ray | |
| 4,141,128 A | 2/1979 | Wonderling | |
| 4,158,554 A | 6/1979 | Bundy et al. | |
| 4,220,459 A | 9/1980 | Hammond et al. | |
| 4,259,095 A * | 3/1981 | Johnson, Jr. | 55/302 |
| 4,264,345 A | 4/1981 | Miller | |
| 4,290,790 A * | 9/1981 | Okubo | 55/379 |
| 4,293,111 A * | 10/1981 | Henri | 248/95 |
| 4,322,231 A | 3/1982 | Hilzendeger et al. | |
| 4,323,376 A | 4/1982 | Rosenquest | |
| 4,324,571 A * | 4/1982 | Johnson, Jr. | 55/302 |
| 4,336,035 A | 6/1982 | Evenstad et al. | |
| 4,435,197 A | 3/1984 | Nijhawan et al. | |
| 4,948,504 A | 8/1990 | Kierdorf et al. | |
| 5,061,303 A | 10/1991 | Williams et al. | |
| 5,173,098 A * | 12/1992 | Pipkorn | 55/379 |
| 5,290,441 A | 3/1994 | Griffin et al. | |
| 5,308,369 A | 5/1994 | Morton et al. | |
| 5,730,766 A | 3/1998 | Clements | |
| 5,800,580 A * | 9/1998 | Feldt | 55/378 |
| 5,928,395 A | 7/1999 | Glen et al. | |
| 5,951,726 A | 9/1999 | Allingham et al. | |
| 6,626,970 B2 * | 9/2003 | Pipkorn et al. | 55/379 |
| 6,790,250 B2 * | 9/2004 | Pipkorn et al. | 55/379 |
| 6,905,529 B2 * | 6/2005 | Pipkorn et al. | 55/379 |
| 7,371,267 B2 * | 5/2008 | Pipkorn et al. | 55/379 |

* cited by examiner

*Primary Examiner* — Duane Smith
*Assistant Examiner* — Minh-Chau Pham
(74) *Attorney, Agent, or Firm* — Patterson Thuente Christensen Pedersen, P.A.

(57) ABSTRACT

A filter bag support structure, including a first section and a second section. The first section includes a pair of opposed alignment members located partially internal to the first section and extending outwardly away from the first section aligned to insert into the second section. The second section includes at least one annular member. The alignment members are receivable within the second section and have engagement members near a distal end. A locking member is removeably insertable between the opposed alignment members and inhibits the alignment members from flexing inwardly when the locking member is inserted and causes the alignment members to resist being removed from the at least one annular member when a tension load is applied that would tend to separate the first section from the second section to a greater degree than when the locking member is not present.

22 Claims, 21 Drawing Sheets

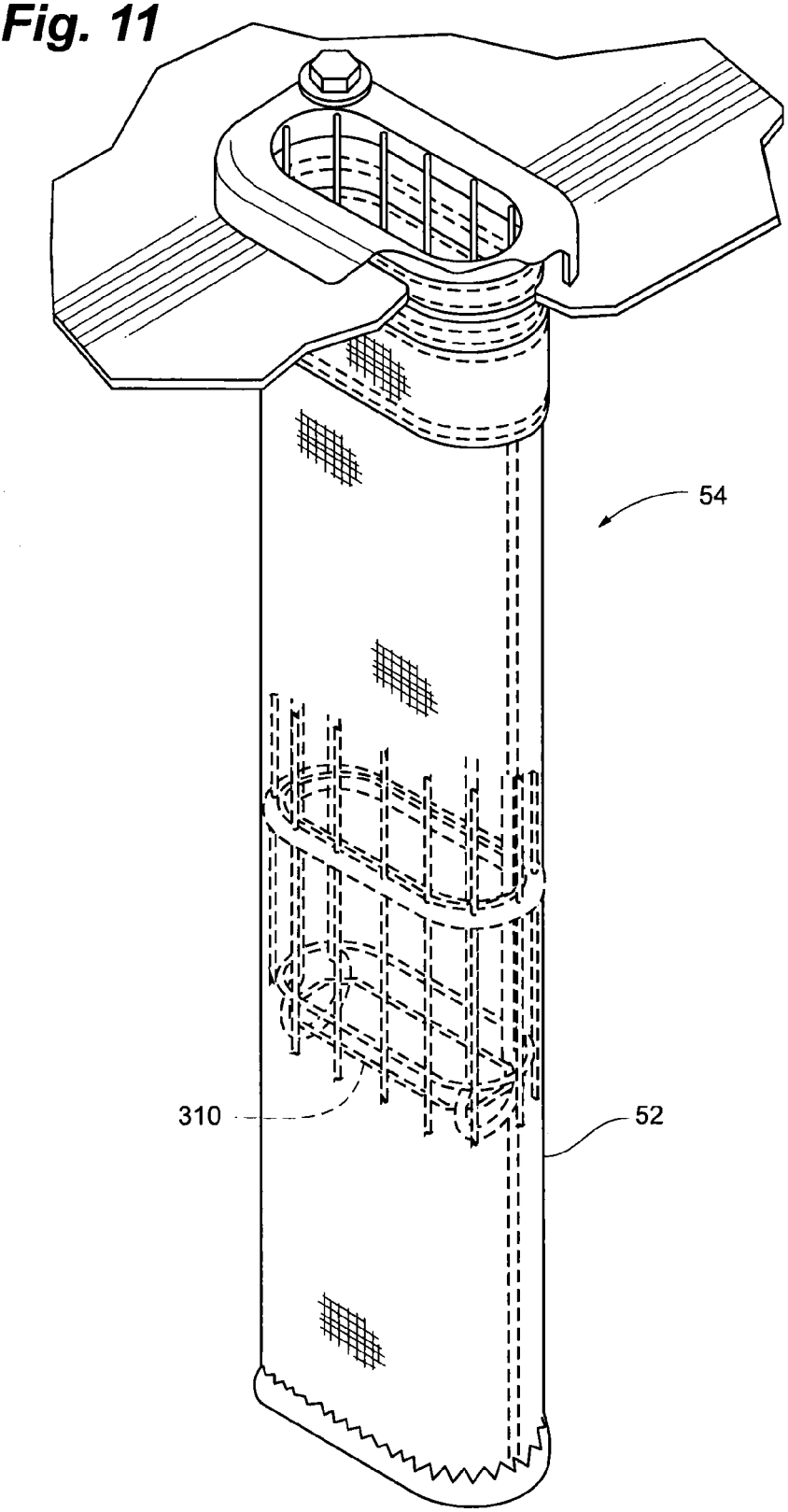

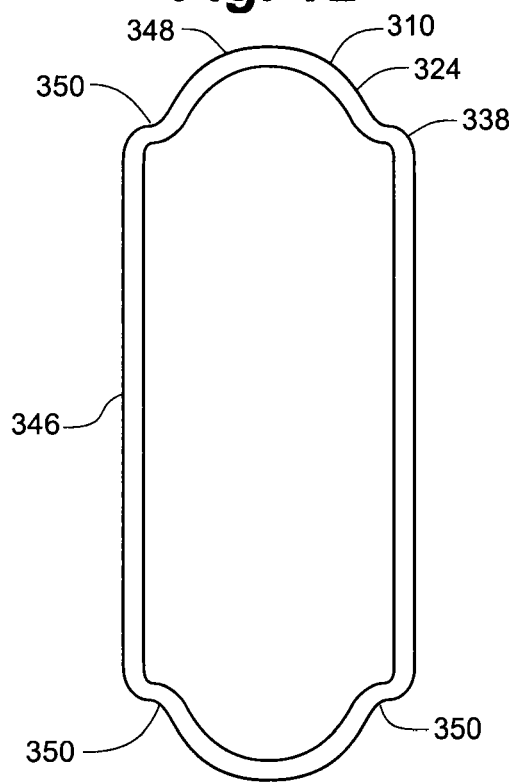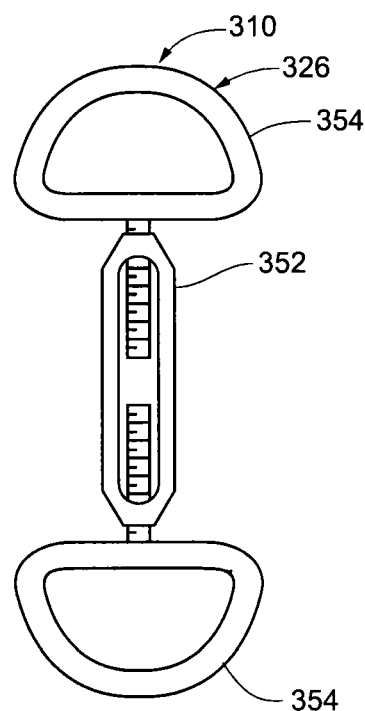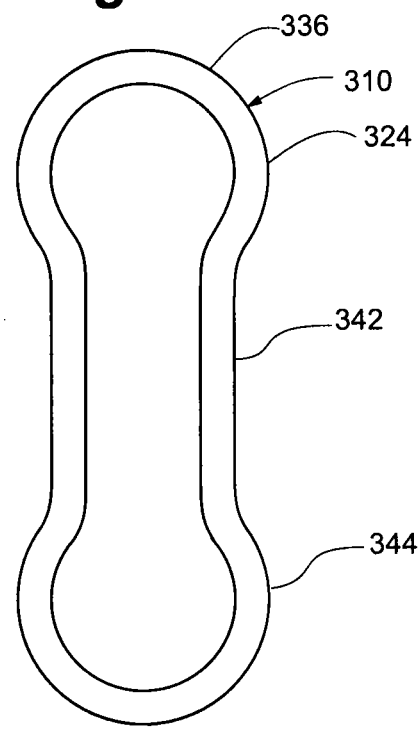

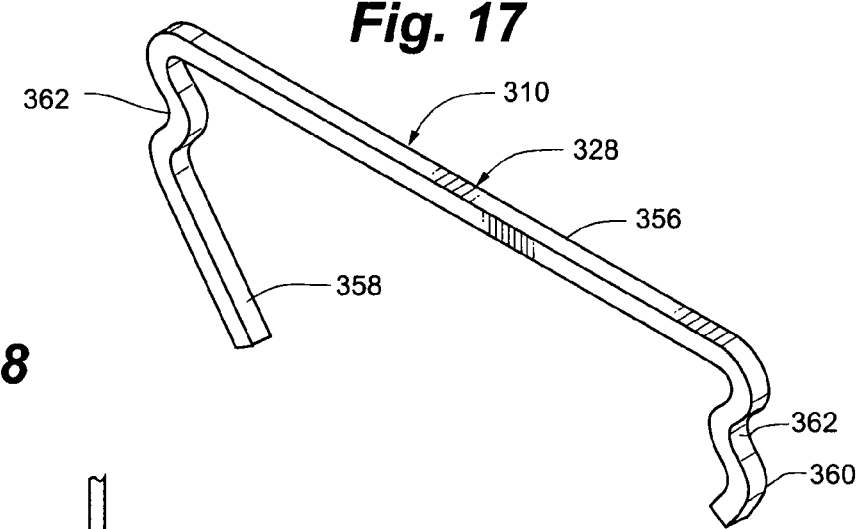
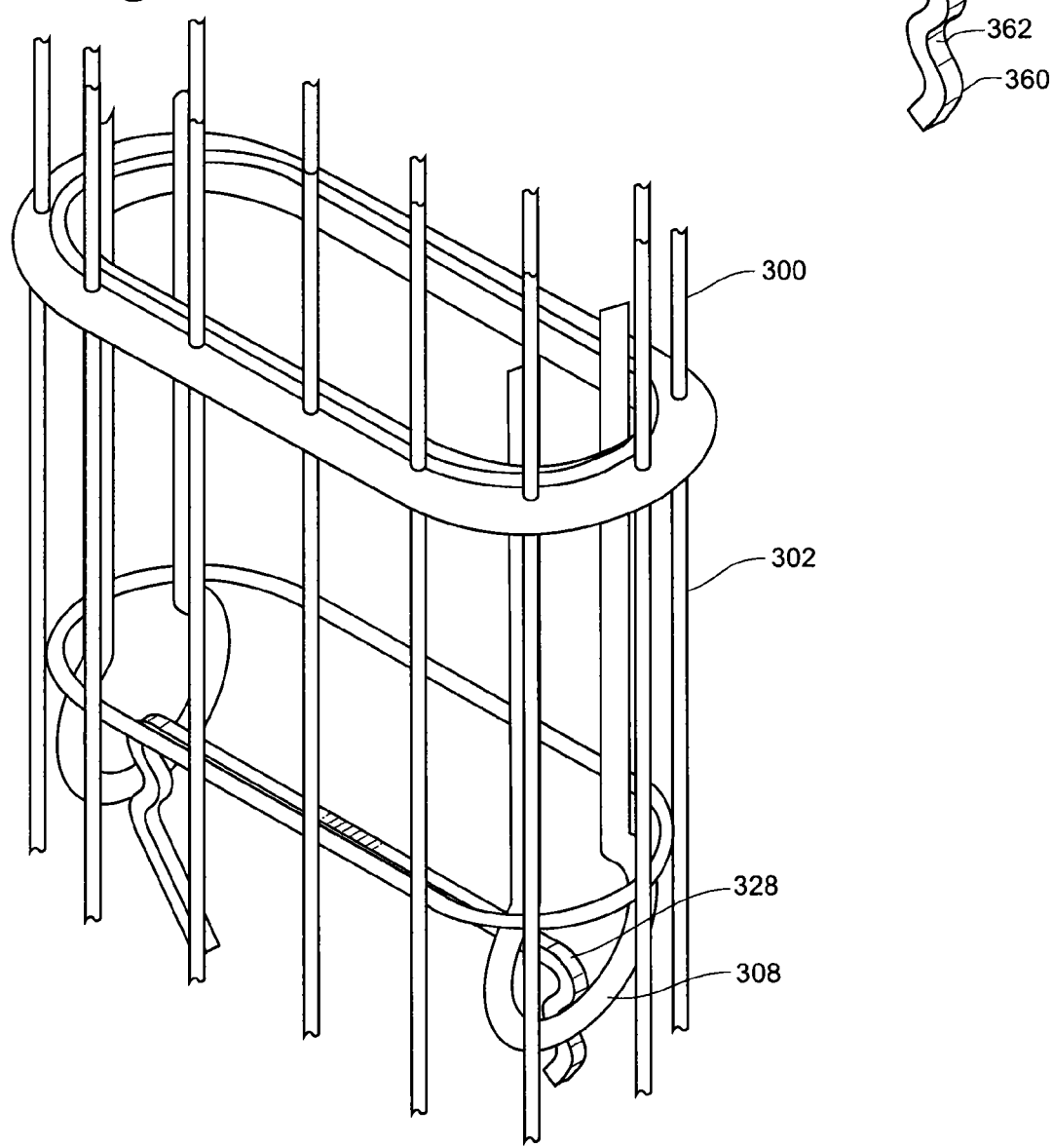

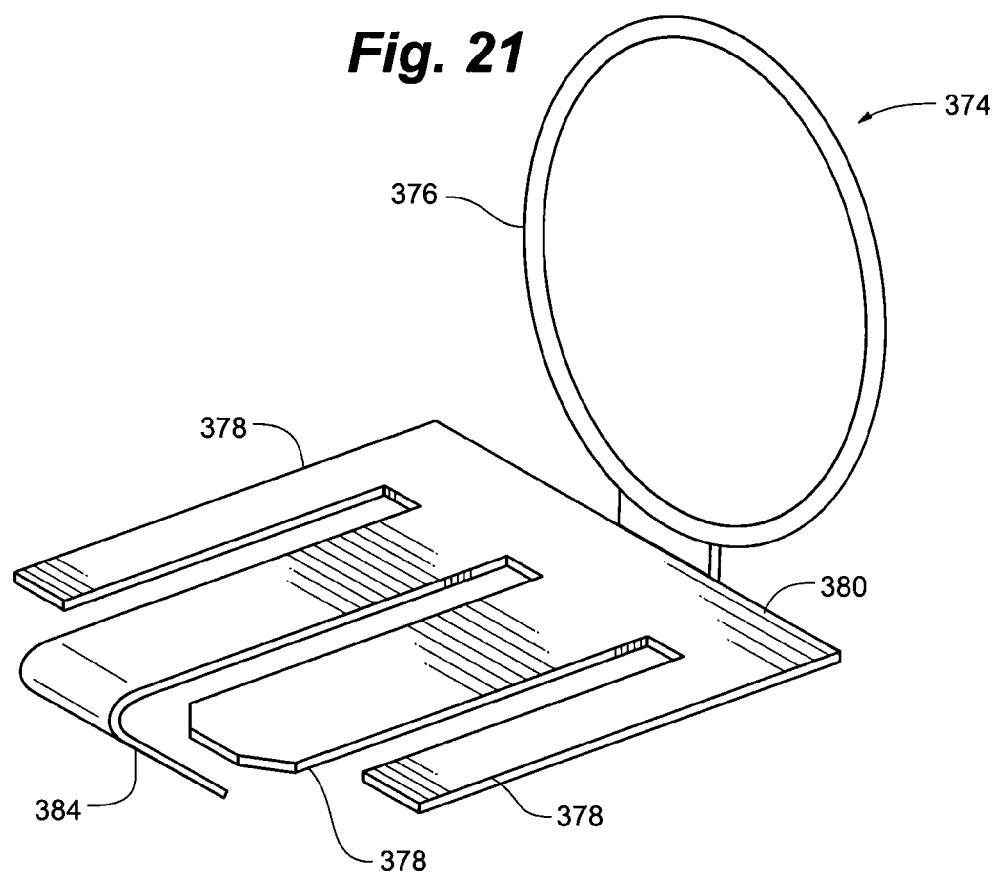
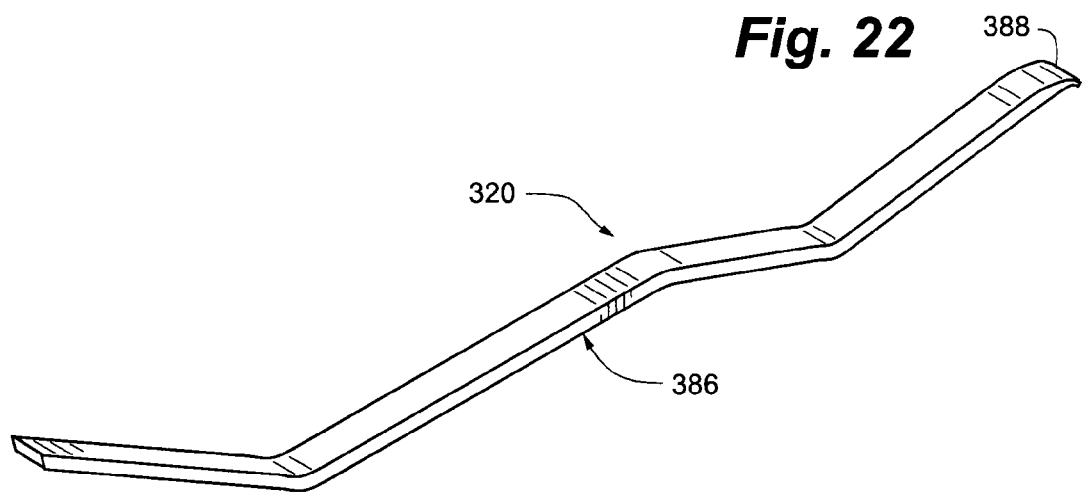

WIRE FILTER CAGE LOCKING MECHANISM

FIELD OF THE INVENTION

The present invention relates to an air filtration system suitable for use within the ventilation system of a building. More particularly, the invention relates to improved filter cages used for supporting elongated filtration bags or socks within such a filtration system and securing filter cage sections together.

BACKGROUND OF THE INVENTION

Air filtration systems utilized in large ventilation systems often employ banks of elongated filtration bags or socks supported by wire filter cage assemblies. The filtration bags are positioned over the filter cages and remove particulates from the air circulated through the bag. The wire filter cages support the bags and prevent the bags from collapsing as air is drawn through the bags. Filter media exclude particulates from passing through the bag along with the air, and the particulates accumulate on the outside of the bags as air is drawn through the bag and filter cage combination.

Wire filter cages supporting filtration bags are commonly used in large-scale filter assemblies. A large-scale filter assembly structure includes a large enclosure. The large enclosure is divided by a horizontal partition plate that separates an upper clean air compartment from a lower dirty air compartment. The partition plate is formed with a large number of openings arranged in a pattern. Each such opening supports a wire filter cage and its associated fabric filter bag. Thus, the air flow passes from the lower dirty air compartment through the suspended filter bags and wire filter cages through the openings in the partition plate and into the upper clean air compartment.

Filter bags are periodically cleaned by shaking or by creating a backflow of air from the inside of the filter bags outward. After an extended period of use it becomes necessary to remove the filter cages and filter bags from the partition plate in order to replace the filter bags. If a one-piece filter cage is employed it is necessary that the upper clean air compartment have sufficient overhead height for the entire length of the filter cage to be accommodated when it is lifted from the horizontal partition plate. Wire filter cages are commonly as long as 26 feet. Some reach lengths of 29 feet. Thus, it is preferred, with lengthy filter cages, that the filter cages be partitioned into two or more sections to allow for a shorter overhead height in the clean air compartment. This shorter overhead height can result in large cost savings in material and construction of large filter assemblies.

Fine dust can form an explosive mixture with air. Air filtration systems are vented to prevent an accumulation of fine dust at a concentration that supports explosive combustion. Larger collector volume requires a greater vent area. A reduction in overhead height and consequently volume in the upper compartment leads to a lower venting cost and associated operating cost.

A variety of techniques have been used to connect multiple sections of wire filter cages. Wire filter cage section connections should be secure and easily assembled and disassembled. In addition, it is desirable that the inner connections be made without leaving any exposed wire ends or other sharp structures. Fabric filter bags are relatively vulnerable to puncture or tearing. If they are snagged on exposed wire ends they may be torn thereby causing particulate leaks and requiring replacement of the bags sooner than would otherwise be necessary.

SUMMARY OF THE INVENTION

The approach to connecting wire filter cage sections disclosed in U.S. Pat. No. 5,173,098, issued to Pipkorn, reveals a connection technique utilizing two sheet metal sleeves and two wire clips. This approach provides an interconnection that is relatively easy to assemble and disassemble. However, under significant longitudinal tension loads the wire clips fail to hold the filter cage sections together. Lower filter cage sections sometimes separate from upper filter cage sections and drop to the floor of the lower dirty air compartment. En route to the floor, the separated lower filter cage sections tear through the associated filter bag destroying the filter bag. Further, upon impacting the floor of the dirty air compartment, the lower filter cage sections are often damaged to a degree that makes them unusable. The damaged filter cage sections as well as the filter bags then must be replaced.

Other approaches to connecting wire filter cage sections are disclosed in U.S. Pat. Nos. 6,626,970, 6,790,250, 6,905, 529 and 7,371,267 issued to Howard Pipkorn and Kal Ugargol which are commonly assigned with this patent application. The filter cage sections include guide members that extend into an adjacent cage section and resiliently engage wire hoops of the adjacent filter cage thereby securing the adjacent filter cage sections together.

Filter cages designed according to these approaches include formed wire guides to create a snap latch joint. The wire guides protrude from the interior of a first wire filter cage section.

The wire guides are inserted into the open end of a second wire filter cage section to join the sections. When the two sections are assembled together on a common axis, the resistance to bending of the wire guides presses the ends of the wire guides against the annular rings of the second wire filter cage, thus aligning the two cages axially and holding the two cages snugly together.

Assembled filter cage sections can be subject to unusually high tension loads during handling and installation. Laborers who install new filter bags sometimes drop the filter cages from a significant height into the openings in the horizontal partition plate which then stops the descent of the filter cage when the top retention structure of the filter cage impacts the horizontal partition plate. The inventors estimate that the tension impulse load on the filter cage joints where the sections are joined exceeds three thousand five hundred pounds when the assembled filter cage is dropped from a height of four feet and strikes the partition plate. This separates the filter cage sections and leads to the damage to filter bags and fallen filter cage sections discussed above. The invention solves many of these problems.

Referring to FIG. 1, a prior art filter cage as disclosed in U.S. Pat. No. 5,173,098 is depicted. The prior art filter cage includes sheet metal sleeves and wire clips to align and secure the filter cage sections to one another. The summary of the invention and detailed description of U.S. Pat. No. 5,173,098 are hereby incorporated by reference in their entirety.

FIG. 2 depicts a prior art wire guide filter cage including wire guide structures which are used to align and join to filter cage sections. Such a wire guide filter cage is disclosed in U.S. Pat. No. 6,905,529. The summary and detail description and drawings of which are incorporated herein by reference in their entirety in this application.

FIG. 3 depicts an example of wire guide filter cage with lock member in accordance with the present invention. A lock member is secured between either the sleeves depicted in the prior art of FIG. 1, or the wire guide depicted in the prior art of FIG. 2 to secure the sleeves or wire guides to prevent their inward displacement, thereby securing the sleeve members or wire guide members coupling a first wire filter cage section and a second wire filter cage section from separating when an unusual longitudinal tension load is applied to the joint.

In one embodiment of the invention, a filter cage lock is inserted between the resilient wire guides of the filter cage and rotated approximately 90° to secure it in place between the resilient wire guides, thus inhibiting the resilient wire guides from flexing inwardly to release the related filter cage section. The rotation of the filter cage lock may be accomplished by hand or with a tool in accordance with the invention. When disassembly of the filter cage section is desired, the filter cage lock may be rotated again approximately 90° and released from between the resilient wire guides. The filter cage lock may then be removed to allow easy disassembly of the filter cage sections.

In another embodiment of the invention, the filter cage lock is adapted to be placed between sheet metal sleeves that have been modified to include engagement dimples on the sheet metal sleeves. In this embodiment as well, the filter cage lock is place between the sheet metal sleeves and rotated approximately 90° to secure the sheet metal sleeves to prevent inward flexing of the sleeves, thereby preventing unintended release of the filter cage sections. When it is desired to release the filter cage sections joined with the sheet metal sleeves, the filter cage lock can again be rotated approximately 90° to release it and then the filter cage lock can be removed from between the sheet metal sleeves facilitating separation of the filter cage sections.

The engagement dimples on the filter guide sleeve can be made by, for example, welding structures to the surface of the sheet metal sleeve, stamping the dimples on a metal stamping press to raise the surface of a sheet metal sleeve or by forming the sheet metal sleeve to have a ridge or bead.

In one embodiment of the invention, which is secured by rotation within the filter cage alignment members, the filter cage lock may have a polygonal configuration. In another embodiment, the filter cage lock may have a race track shaped configuration. In another embodiment, the filter cage lock may have dog bone shaped configuration. In another embodiment, the rotating filter cage lock may have a dome end configuration.

In accordance with other embodiments of the present invention, the filter cage lock may be secured in place by means other than rotation. For example, one embodiment of the present invention includes a turnbuckle, which can be used to separate two contact members to secure the contact members against the inside of the resilient wire guides or the resilient sheet metal sleeves.

In another embodiment of the present invention, two contact members may be coupled to an over-center mechanism which can be used to lock the contact members in an outward position against the interior of the resilient sheet metal sleeves or the resilient wire guides.

In another embodiment, the filter cage lock includes a bent clip filter cage lock. The bent clip filter cage lock is shaped to snap between the resilient wire guides or the resilient sheet metal sleeves of the filter cage sections.

In another embodiment, the filter cage lock may be structured as a linear clip filter cage lock. The linear clip filter cage lock may be formed of, for example, steel or aluminum channel having curved retainers at each end to couple with the resilient wire guides of the filter cage sections.

In another embodiment of the filter cage lock, the filter cage lock may be secured in a hinged fashion from one of the resilient wire guides or one of the sheet metal guides.

In another embodiment, the invention further includes a filter cage support and filter cage lock loss protector. The filter cage support and filter cage lock loss protector is structured to be insertable through the filter cage body to support the filter cage sections with a portion of it extended above and a portion of it extending below the horizontal partition plate of the filter assembly. The filter cage support and lock loss preventer further reduces the risk that filter cage locks that are dropped within the filter cage will fall down the filter cage to a location below the horizontal partition.

In one embodiment, the filter cage support and lock loss protector comprises a horizontal structure having several finger members that extend through the width of the filter cage.

In one embodiment, at least one of the finger members may have bent down portion to provide additional support for the filter cage and to prevent the filter cage support and lock loss protector from being inadvertently removed from within the filter cage. The filter cage support and lock loss preventer may also include a handle to facilitate handling by laborers utilizing it.

In one embodiment of the invention, the invention further includes a filter cage lock installation and removal tool. The filter cage lock installation and removal tool is a pry bar having a curved or retaining end adapted to assist in rotation of the filter cage lock.

In use, the filter cage lock is secured between the filter cage guide members whether they are sheet metal or wire guide members, after the filter cage sections are assembled. The filter cage lock inhibits inward movement of the filter cage guide members thus securing the filter cage sections together with much greater strength than the filter cage guide members alone.

The filter cage support and lock loss preventer can be inserted through the filter cage and abutted against the horizontal partition of the filter structure to support the filter cage at a convenient height for a laborer inserting the filter cage lock and assembling the filter cage sections.

The inventors have demonstrated experimentally that use of the filter cage lock with filter cage sections creates a joint strong enough that the filter cages themselves structurally fail prior to the joint releasing inadvertently.

BRIEF DESCRIPTION OF THE DRAWINGS

FIG. 11 is perspective phantom view of a filter cage and filter bag with two sections joined and locked in accordance with an embodiment of the invention;

FIG. 12 is plan view of a dome end filter cage lock in accordance with an embodiment of the invention;

FIG. 13 is plan view of turnbuckle filter cage lock in accordance with an embodiment of the invention;

FIG. 14 is a plane view of dog bone shaped filter cage lock in accordance with an embodiment of the invention;

FIG. 17 is a perspective view of a bent clip filter cage lock in accordance with an embodiment of the invention;

FIG. 18 is a perspective view of the bent clip filter cage lock of FIG. 17 installed in a filter cage in accordance with an embodiment of the invention;

FIG. 21 is a perspective view of a filter cage support and filter cage lock loss protector in accordance with an embodiment of the invention;

FIG. 22 is a perspective view of a filter cage lock installation tool like that depicted in FIGS. 5, 6A and 6B in accordance with an embodiment of the invention;

DETAILED DESCRIPTION OF THE INVENTION

Figure 1:
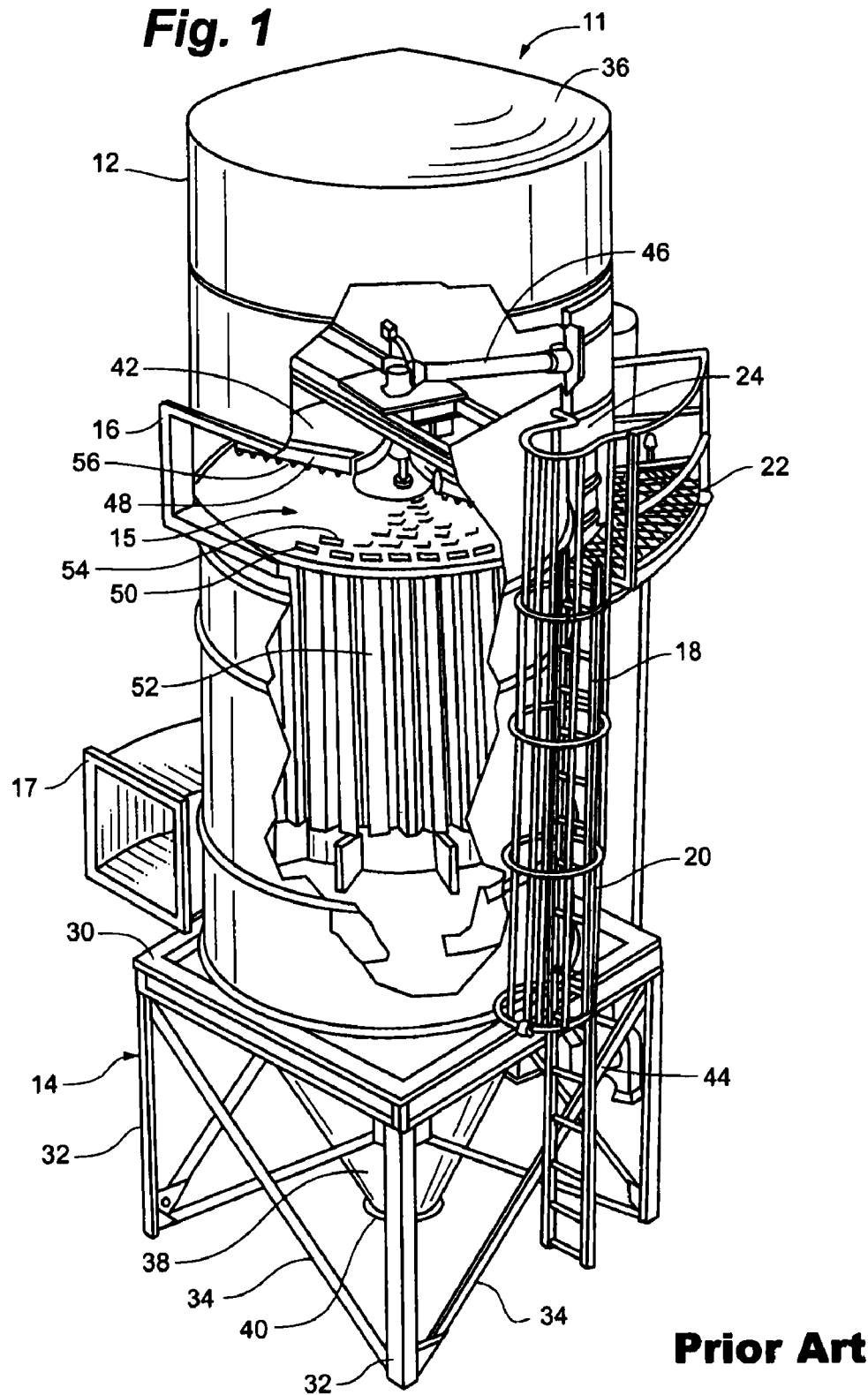
FIG. 1 is a cutaway perspective view of a large-scale filter assembly that can utilize a plurality of wire filter cages in accordance with the present invention.

Referring to FIG. 1, a plurality of filter elements are depicted as installed in an air filtration unit 11. The air filtration unit 11 broadly includes plenum enclosure 12, base frame 14, air filtration assembly 15, filtered exhaust duct 16, and air intake duct 17. Air filtration unit 11 is utilized, for instance, in power or nuclear plants, coal dumping facilities, grain handling facilities and buildings where refining operations may take place. Typical ventilation systems used in these environments may range in height from fifty to one hundred feet. An access ladder 18, surrounded by safety cage 20, leads up to catwalk 22, provides access to plenum enclosure 12 through access door 24. Filtered exhaust duct 16 and air intake duct 17 may be attached to an integral with plenum enclosure 12. Air filtration assembly 15 is positioned within plenum enclosure 12. Plenum enclosure 12 is positioned on base frame 14.

Base 14 may include frame 30, legs 32, and braces 34. Base 14 may vary in size and proportion, depending on the size of the plenum enclosure 12 to be supported on base 14. Base 14 can be made of a variety of high strength, durable materials such as structural steel.

Plenum enclosure 12 may be a large, generally cylindrical structure, ranging from twenty-five to fifty feet in height. Plenum cover or roof 36 is positioned over plenum enclosure 12. Dust collection funnel 38 tapers downwardly toward dust discharge mouth 40. The funnel 38 is positioned underneath plenum enclosure 12, residing within the space below base frame 30 and between legs 32 and braces 34.

Air filtration assembly 15 is contained mainly within plenum chamber 42. Air filtration assembly 15 comprises an air pressure pump 44, pressurization nozzle input duct 46, nozzle arm 48, and numerous filter elements 50 having air permeable hanging filter media bags or socks 52 surrounding filter cages 54. In a typical large capacity air handling system, often employing multiple air filtration units 11, tens of thousands of filter bags 52 and tens of thousands of wire filter cages 54 may be utilized. Air pressure pump 44 is connected to nozzle duct 46. Nozzle arm 48 is positioned beneath nozzle duct 46, and has air nozzles 56 opening in a downwardly direction, directed toward filter elements 50.

Filter media bags or socks 52 are attached to filter cages 52. Filter cages 54 rest on and are supported by bag hanger deck 62. Filter media bags 52 are positioned over and supported by wire filter cages 54. Unfiltered air enters air filtration unit 11 through intake duct 17 so as to be processed through air filtration assembly 15. Filtered air is expelled from air filtration unit 11 through filtered exhaust duct 16.

Figure 2:
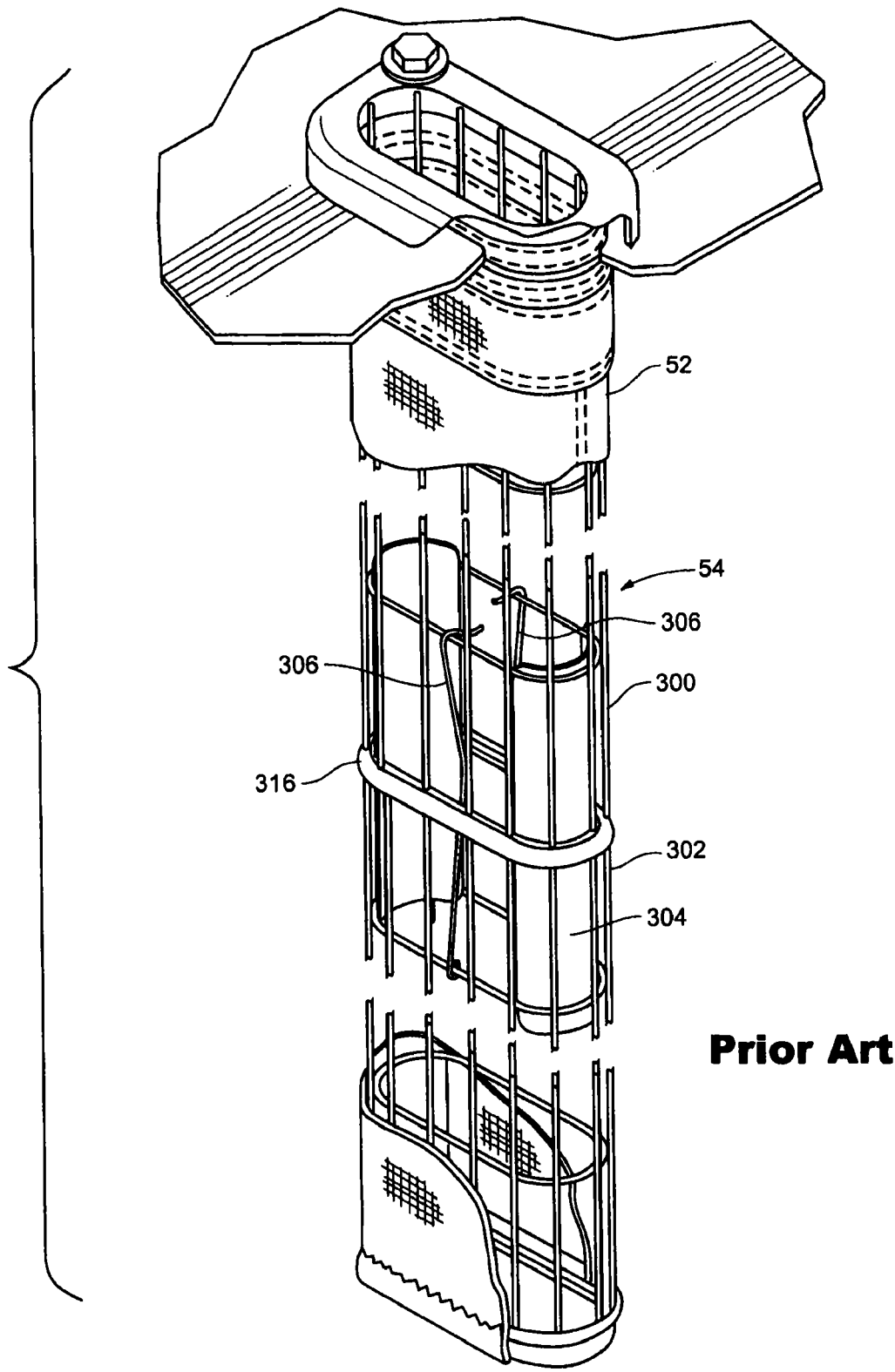
FIG. 2 is a perspective, partially cutaway view of two joined sections of a prior art filter cage including sheet metal sleeves.
Figure 3:
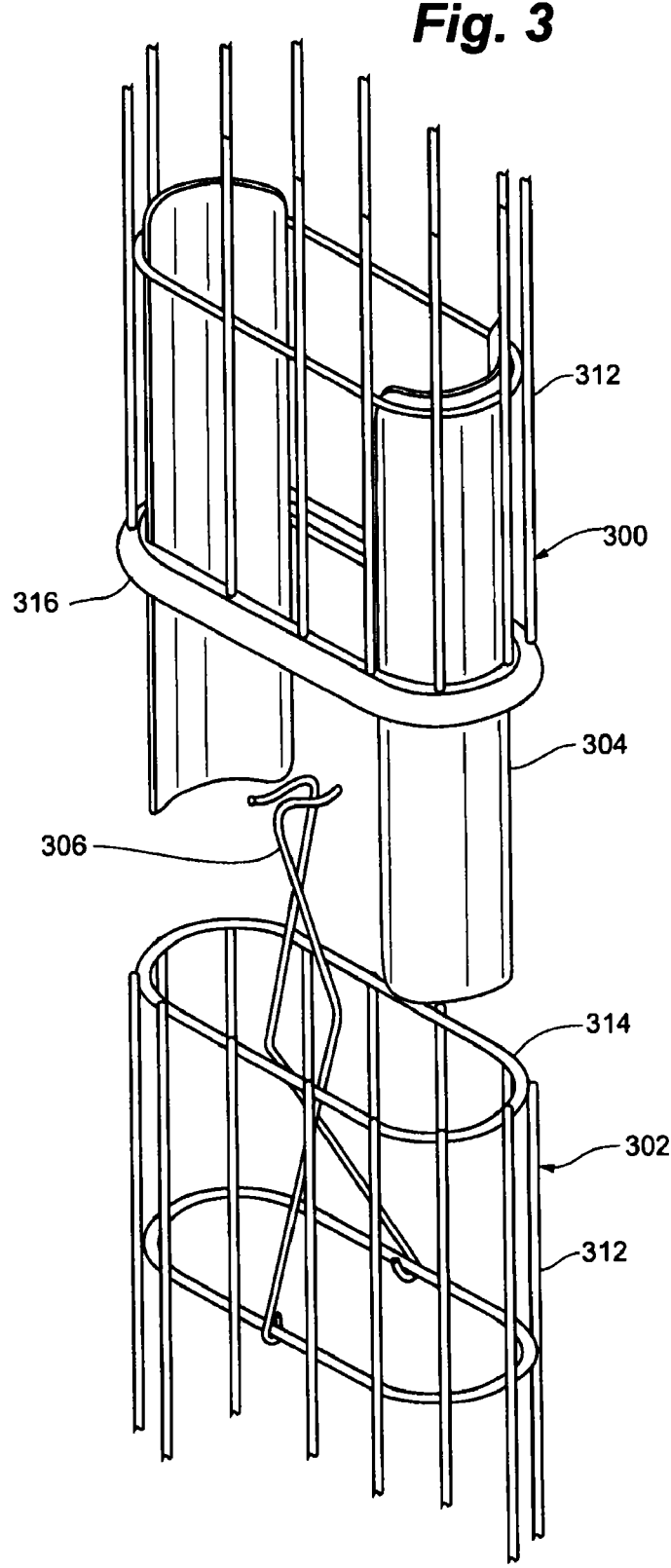
FIG. 3 is a perspective view of two sections of the prior art filter cage of FIG. 1 with the sections separated.

Referring to FIG. 2, an example prior art filter cage 54 and filter bag 52 are depicted. Filter cage 54 generally includes first section 300 and second section 302. First section 300 includes sheet metal sleeves 304 attached thereto. Second section 302 includes wire clips 306 articulated therefrom. Referring to FIG. 3, sheet metal sleeves 304 are used to align and couple first section 300 to second section 302 and first section 300 and second section 302 are secured by wire clips 306.

Figure 4:
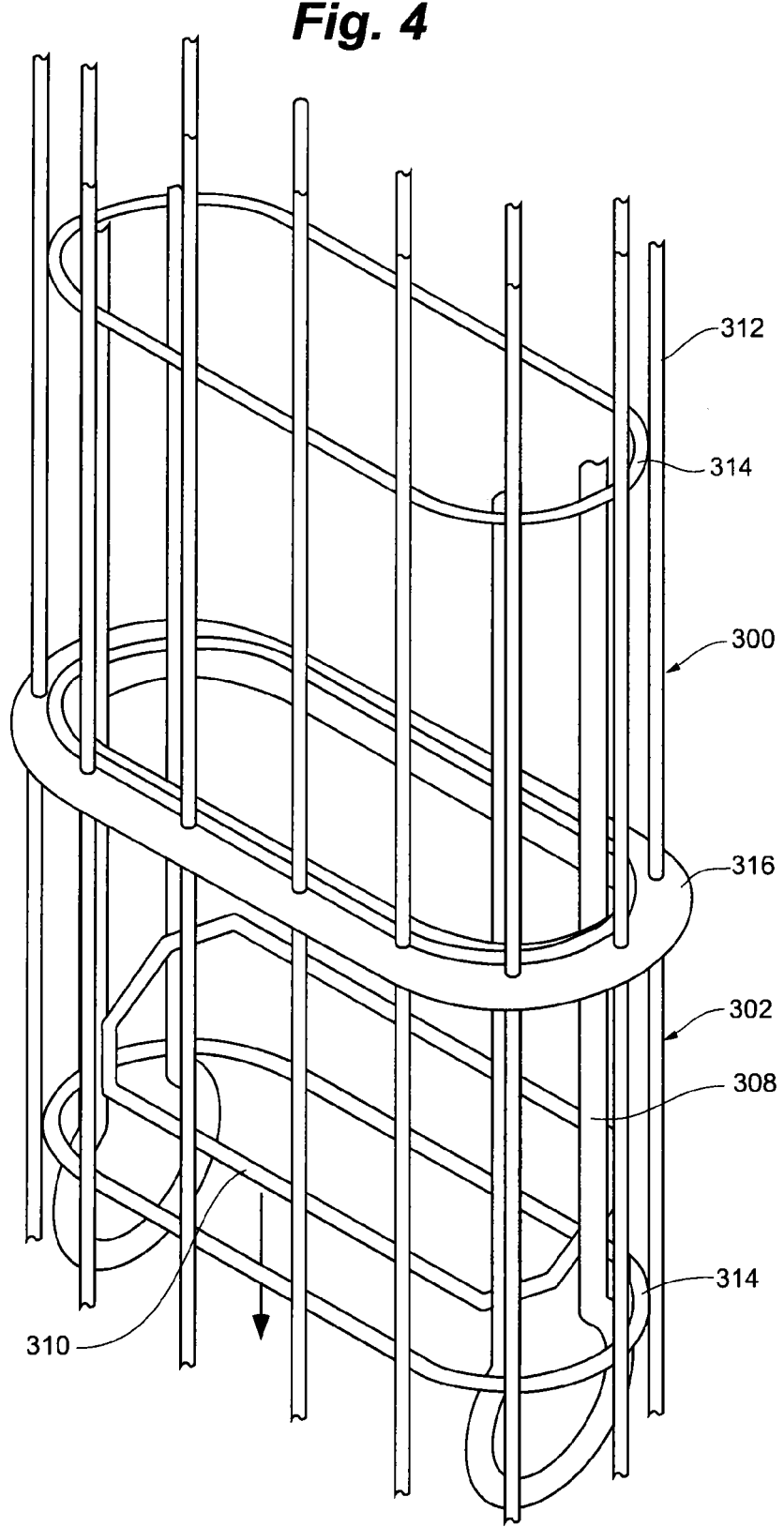
FIG. 4 is a perspective, view of two joined sections of a prior art filter cage including resilient wire guides and a cage lock in accordance with an embodiment of the present invention.

FIG. 4 depicts a filter cage 54 including resilient wire guides 308 and filter cage lock 310 in accordance with the invention. Filter cage 54 generally includes longitudinal members 312 and annular members 314 in addition to wire guides 308. Annular members 314 may include an annular member 316 which is of larger size than remaining annular members 314. Annular members 314 define the cross sectional shape of the filter cage and may be circular, oval, racetrack shape polygonal or any other shape. Generally, filter cage 54 is formed of metal wires. However, it is specifically contemplated that the invention disclosed here may be used with any type of filter cage or filter support. Examples include but are not limited to filter cages made from plastics, composites and perforated sheet materials.

Wire guides 308 and sheet metal sleeves 304 may be collectively referred to as alignment members. The term alignment members is not, however, limited to only to wire guides 308 and sheet metal sleeves 304.

Wire guides 308 extend outwardly from the end of first section 300 and are structured to engage second section 302 at one of annular members 314 of second section 302. Wire guides 308 may have rounded ends 318 as depicted in FIG. 4 or may have ends of a variety of shapes as disclosed in U.S. Pat. No. 6,626,970, 6,790,250, 6,905,529 or 7,371,267, the drawings, summary and detailed descriptions of which are hereby incorporated by reference.

Figure 5:
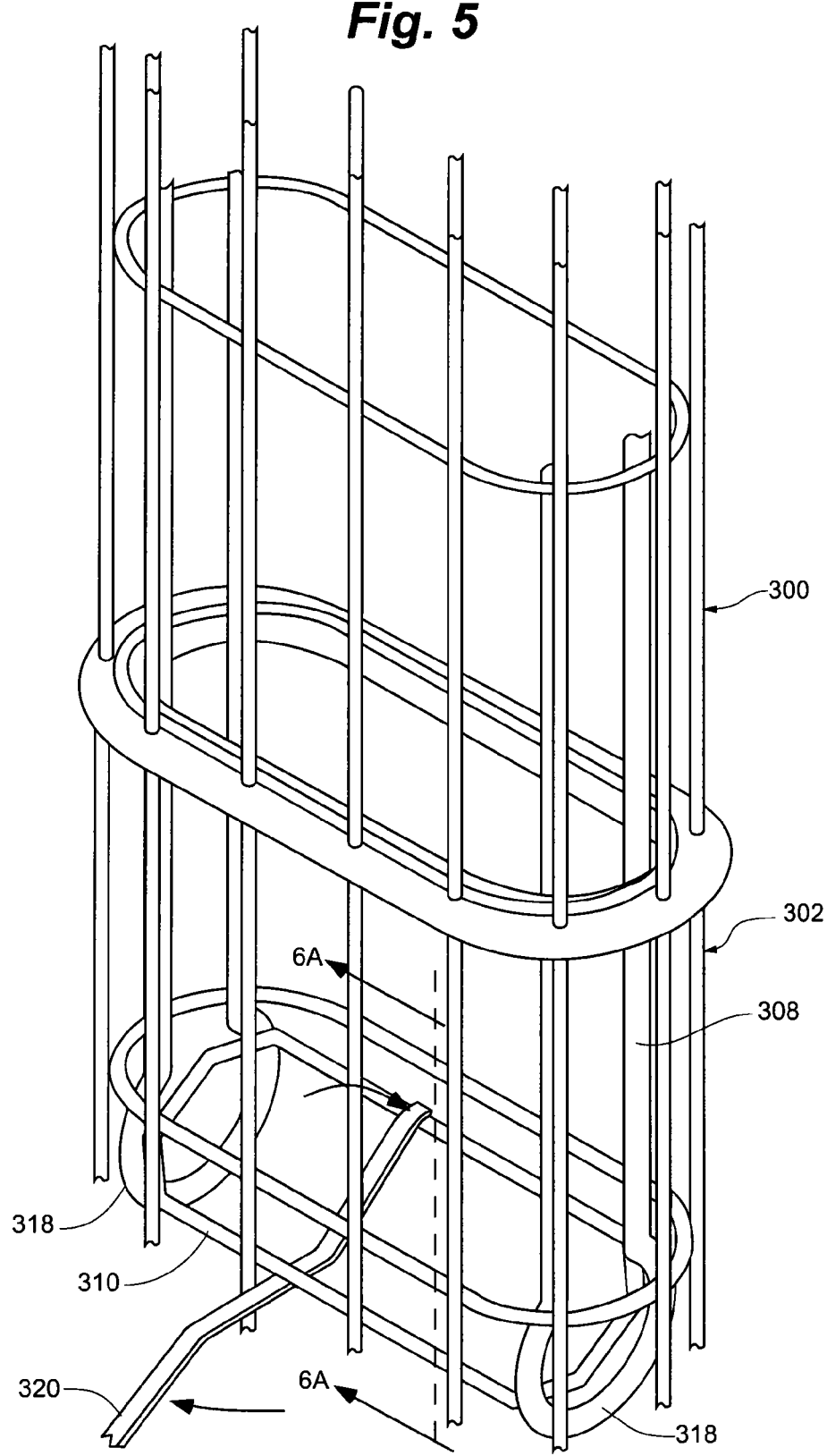
FIG. 5 is a perspective view of two joined sections of a filter cage and a polygonal filter cage lock and installation tool in accordance with an embodiment of the present invention.

Referring to FIGS. 4 and 5, cage lock 310 is depicted in FIG. 4 prior to being installed completely. Cage lock 310 is depicted in FIG. 5 partially secured. FIG. 5 further depicts an example embodiment of installation tool 320. Installation tool 320 is structured to assist in rotating cage lock 310 into the secured position and to assist in removing cage lock 310 from the secured position.

Figure 6A:
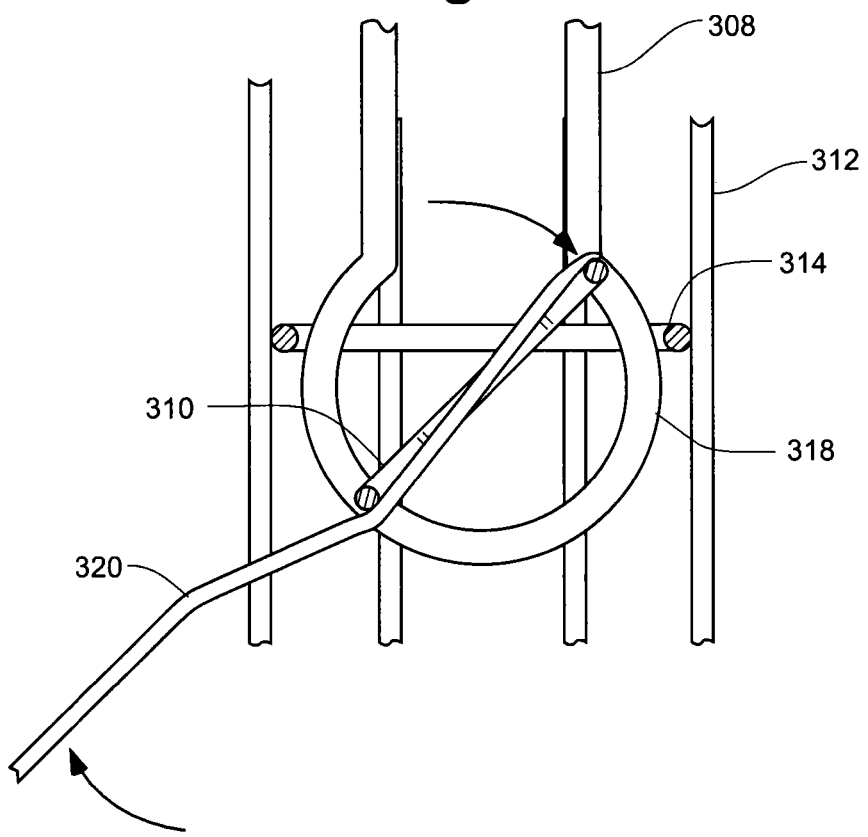
FIG. 6A is a cross sectional view of the filter cage and a polygonal filter cage lock and installation tool taken along section line 6-6 of FIG. 5 with the filter cage lock partially installed in accordance with an embodiment of the invention.
Figure 6B:
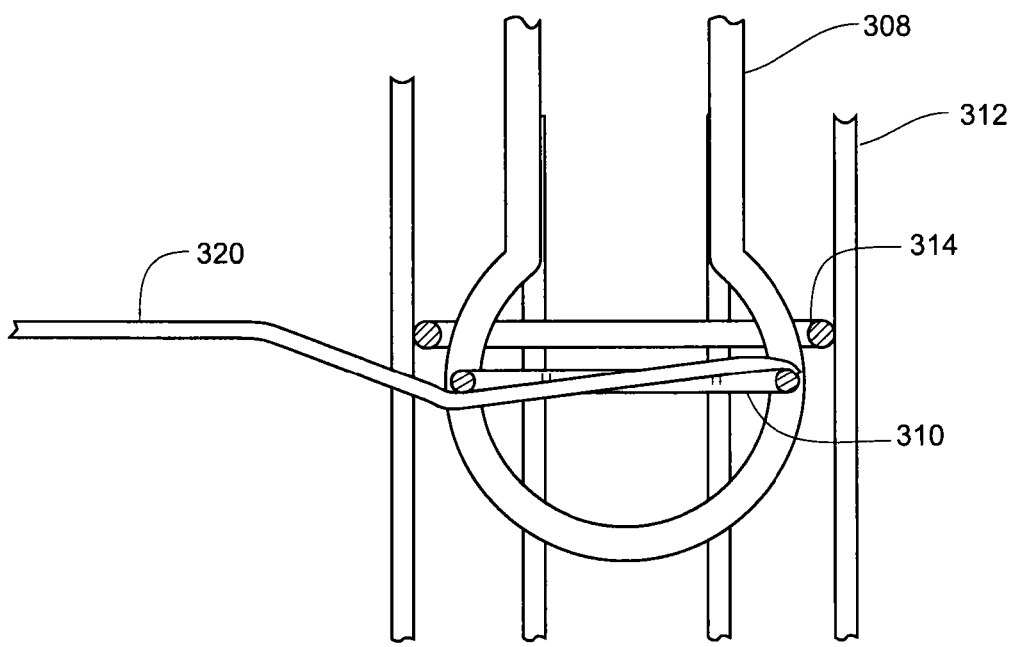
FIG. 6B is a cross sectional view of the filter cage and a polygonal filter cage lock and installation tool taken along section line 6-6 of FIG. 5 with the filter cage lock installed in an installed position in accordance with an embodiment of the invention.
Figure 7:
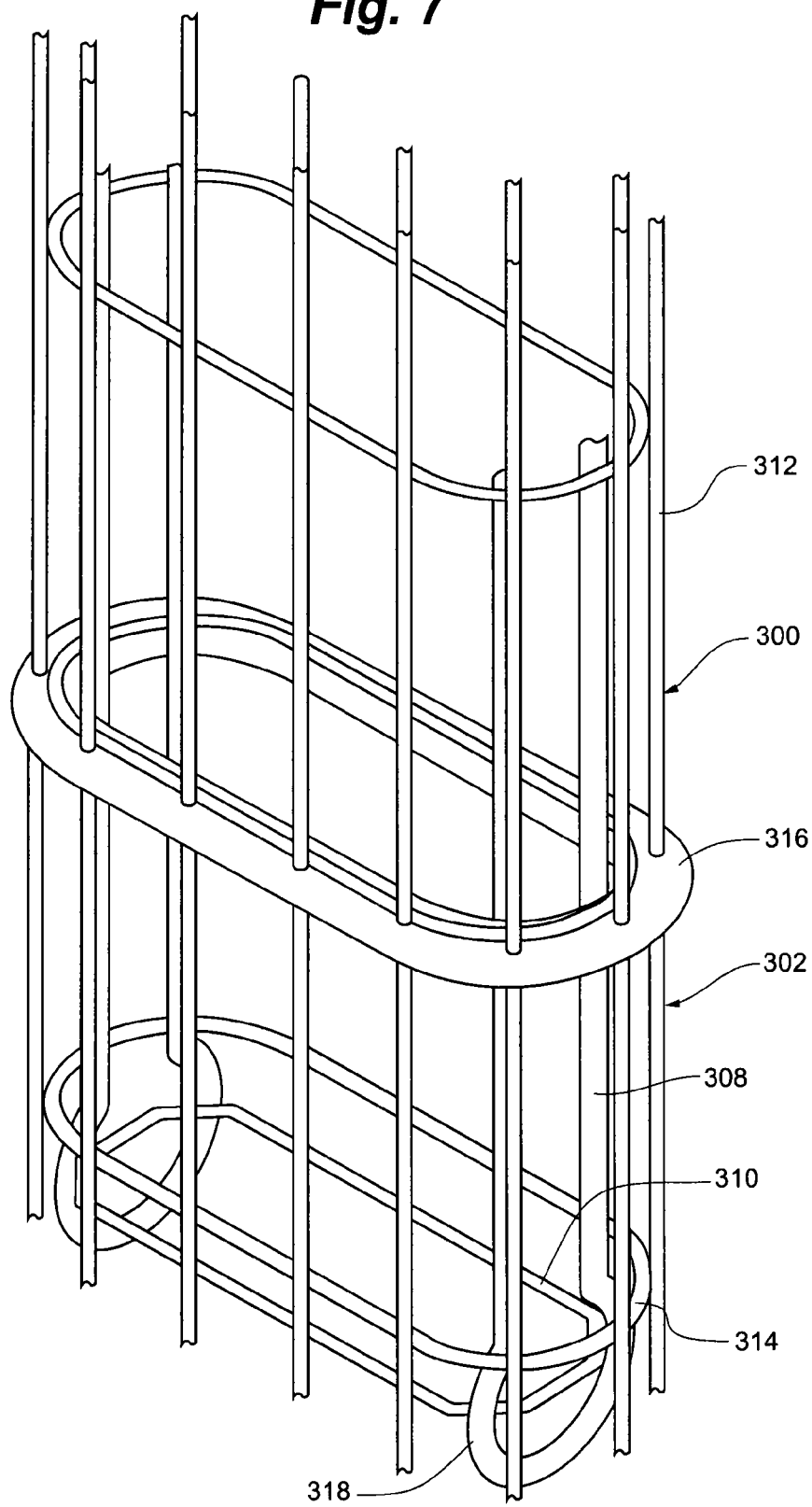
FIG. 7 is perspective view of two joined sections of a filter cage and a filter cage lock in an installed position in accordance with an embodiment of the invention.

Referring to FIG. 6a, cage lock 310 is depicted as engaged by installation tool 320 at the beginning of the installation process. Referring to FIG. 6b, cage lock 310 is depicted along with installation tool 320 in an installed position. FIG. 7, depicts an example cage lock in a perspective view in the installed position.

Figure 8:
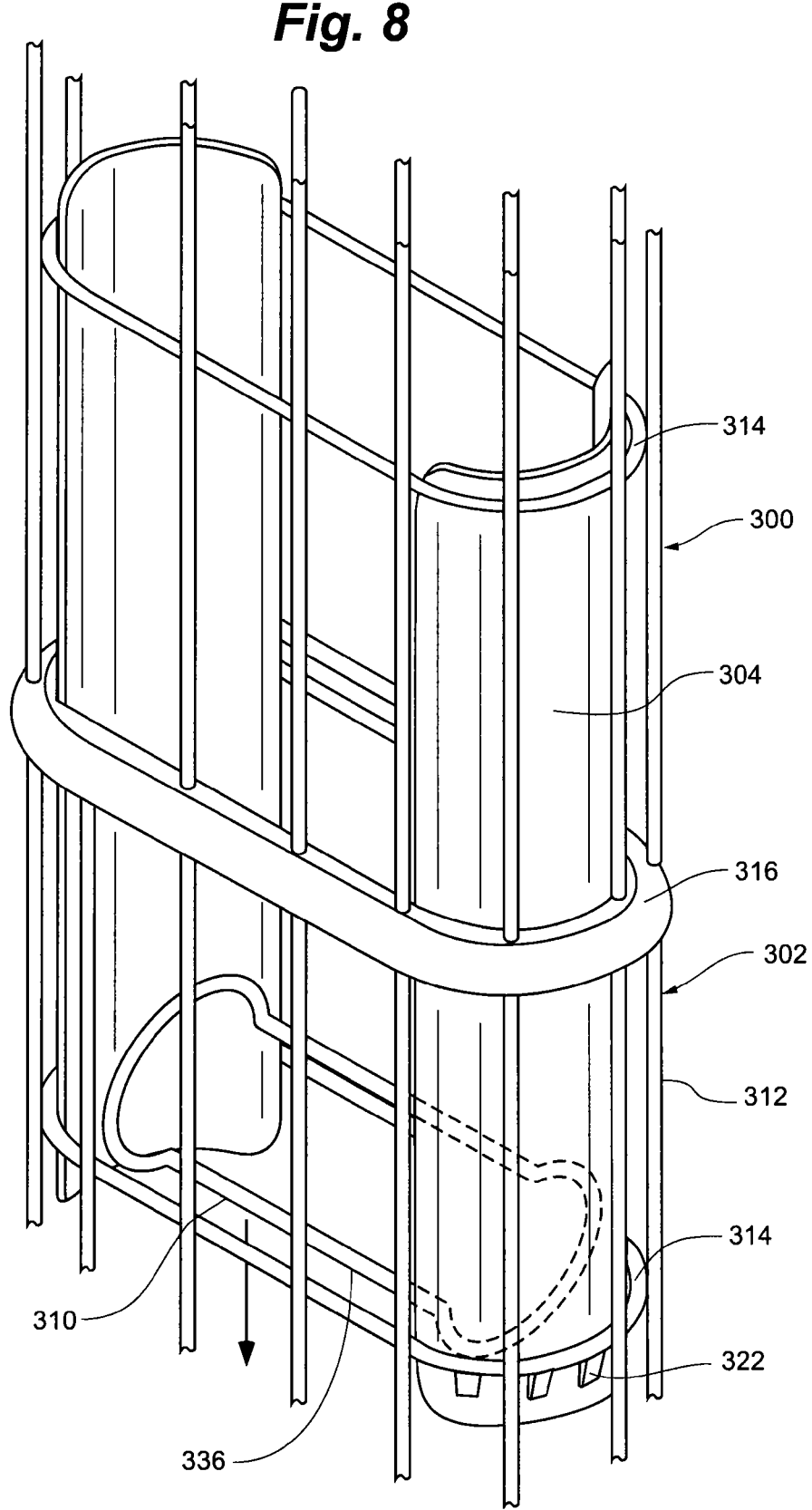
FIG. 8 is a perspective view of two joined sections of a filter cage including sheet metal sleeves with a dog bone shaped filter cage lock in a partially installed position shown partially in phantom and detent dimples on the sheet metal sleeves in accordance with an embodiment of the invention.

Referring to FIG. 8, an example embodiment of cage lock 310 is depicted along with filter cage 54 including sheet metal sleeves 304 in accordance the present invention. Sheet metal sleeves 304 include engagement dimples 322. Engagement dimples 322 are positioned on sheet metal sleeves 304 to engage annular member 314 to assist in securing first section 300 to second section 302. Engagement dimples may be formed by structures which protrude from the outer surface of sheet metal sleeves 304 or by forming a protrusion on sheet metal sleeves 304 or by dimpling metal sleeves 304 with a punch or press. FIG. 8 also depicts cage lock 310 in accordance with the present invention.

Figure 9:
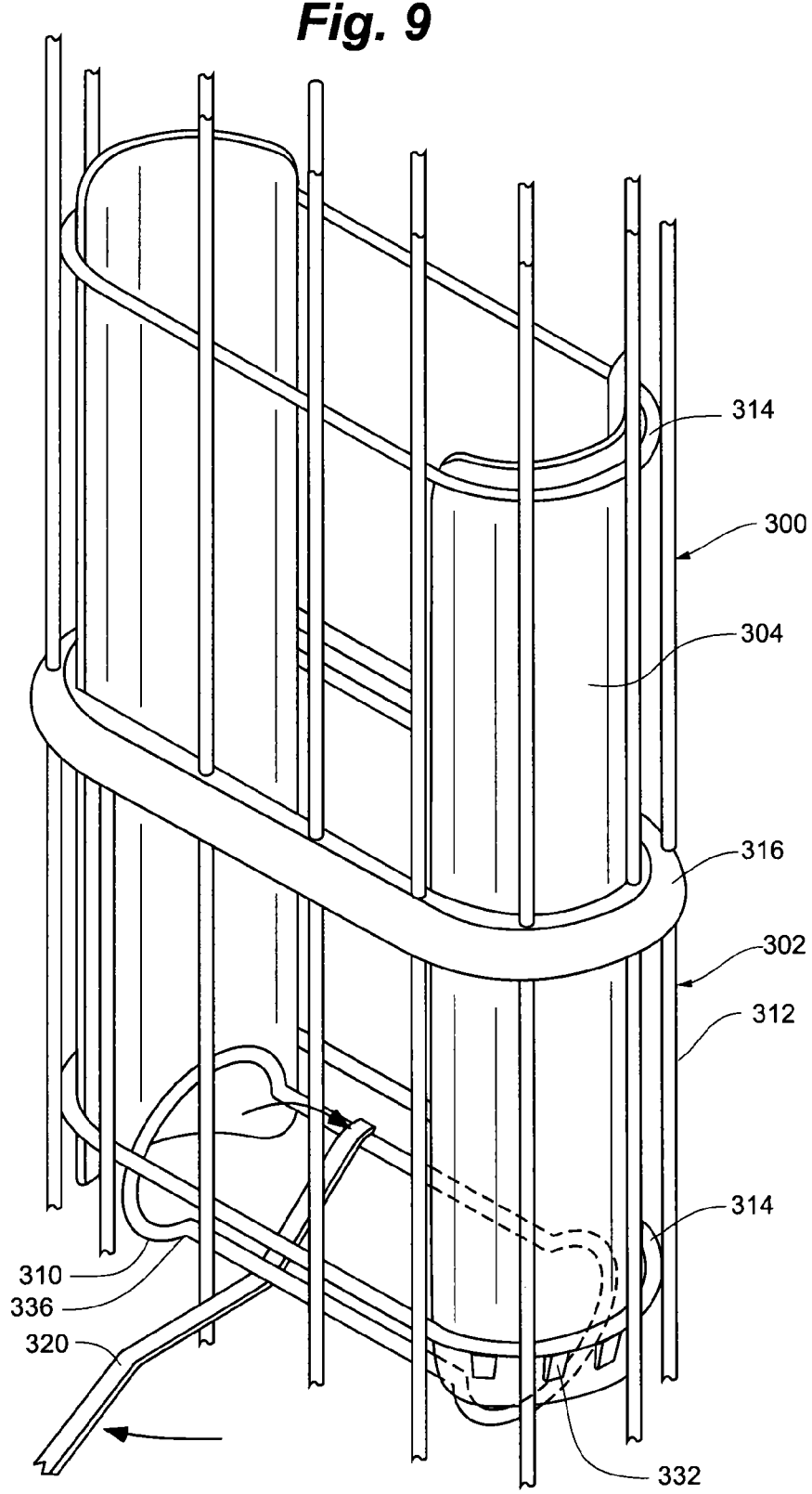
FIG. 9 is a perspective view of the filter cage of FIG. 8, a filter cage lock and installation tool in a partially installed position in accordance with an embodiment of the invention.

FIG. 9 depicts rotation of cage lock 310 in cooperation with sheet metal sleeves by installation tool 320.

Figure 10:
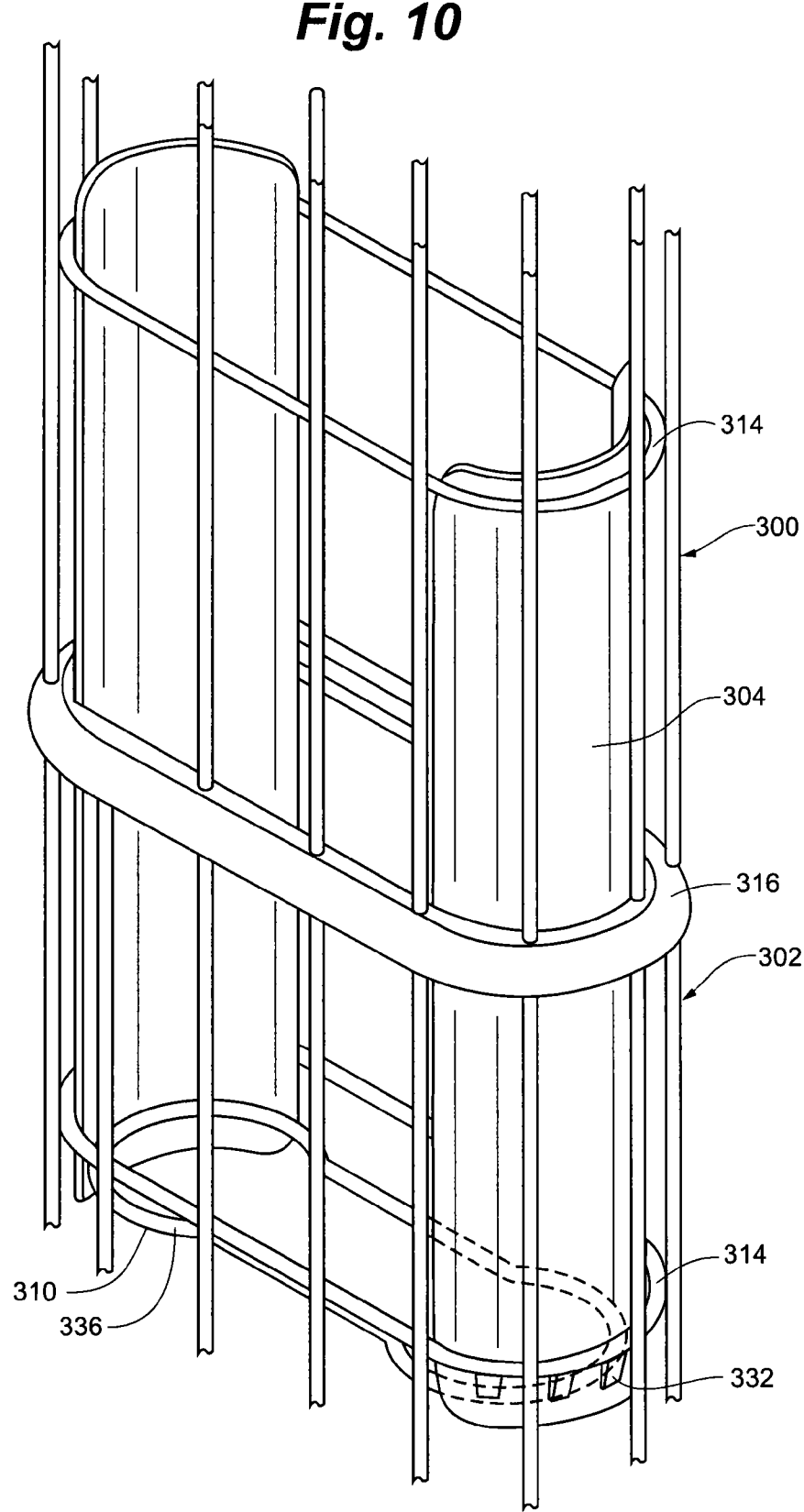
FIG. 10 is a perspective view of the filter cage of FIG. 8 and a filter cage lock in an installed position in accordance with an embodiment of the invention.

Referring now to FIG. 10, cage lock 310 is depicted in an installed position.

FIG. 11 depicts cage lock 310, in phantom, in an installed position within filter cage 54 covered by filter bag 52. As can be understood from FIG. 11, cage lock 310 has minimal effect on air flow through filter bag 52 and filter cage 54.

Cage lock 310 may include a variety of embodiments including rotating cage lock 324, turnbuckle cage lock 326, bent clip cage lock 328, linear clip cage lock 330 and over-center cage lock 332.

Rotating cage lock 324 may include polygonal cage lock 334, dog bone cage lock 336, dome end cage lock 338 and race track cage lock 340. This list should not be considered limiting. All of the embodiments of rotating cage lock 324 are installed and removed generally as depicted in FIGS. 4, 5, 6a, 6b, 7, 8, 9 and 10. Referring to FIGS. 4, 5, 7 and 10, polygonal cage lock 334 in one example embodiment can be made in a generally octagonal shape.

Referring to FIGS. 8-10 and 14, dog bone cage lock 336, in an example embodiment, includes two linear sections 342 and two circular sections 344. Circular sections 344 may be of other rounded shapes besides perfectly circular.

Referring to FIG. 12, dome end cage lock 338 includes two linear sections 346, two dome sections 348 and steps 350.

Referring to FIG. 13, turnbuckle cage lock 326 generally includes turnbuckle 352 and contact portions 354. Turnbuckle 352 is configured to expand and retract contact portions 354 upon actuatation of turnbuckle 352.

Figure 15:
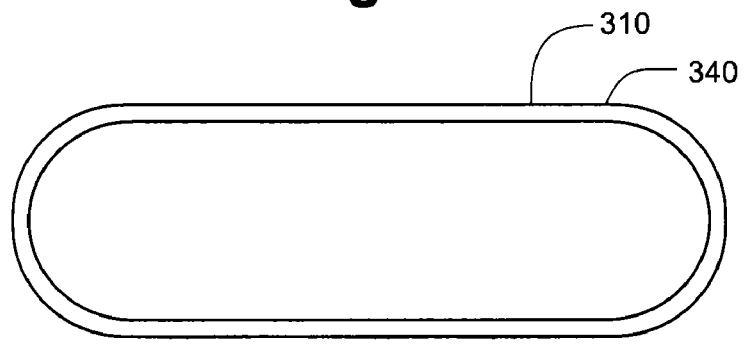
FIG. 15 is a plane view of a race track shaped filter cage lock in accordance with an embodiment of the invention.

Referring to FIG. 15, race track cage lock 340 assumes a generally oval or race track shaped configuration.

Referring to FIGS. 17 and 18, bent clip cage lock includes linear portion 356, long leg 358 and short leg 360. Each of long leg 358 and short leg 360 include indentation 362.

Figure 19:
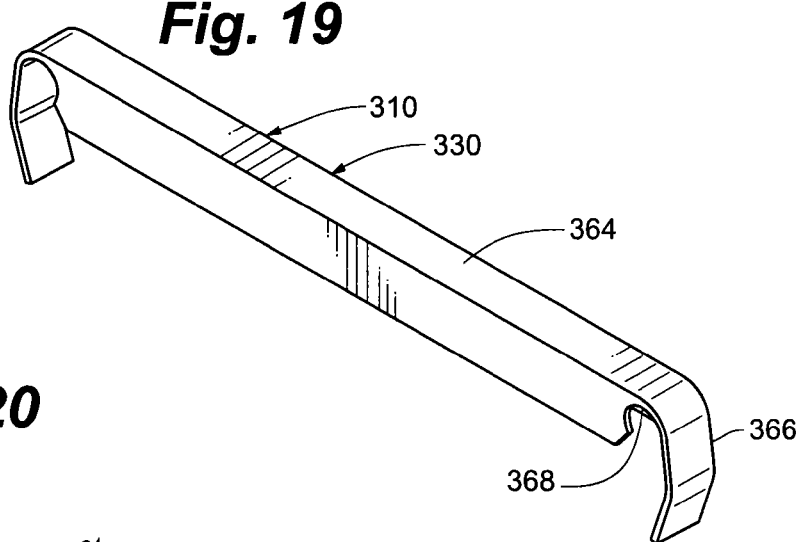
FIG. 19 is a perspective view of a linear clip filter cage lock of FIG. 17 installed in a filter cage in accordance with an embodiment of the invention.
Figure 20:
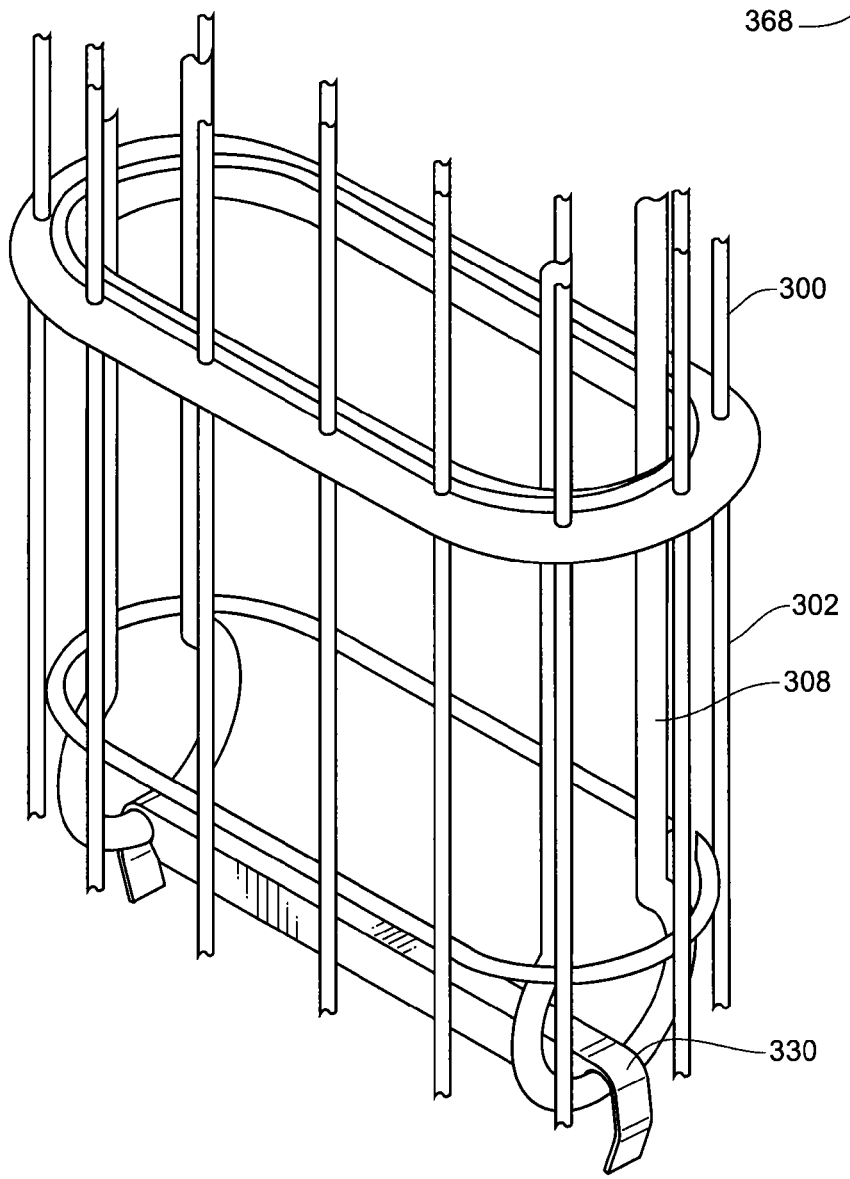
FIG. 20 is a perspective view of the linear clip filter cage lock of FIG. 17 installed in a filter cage in accordance with an embodiment of the invention.
Figure 23:
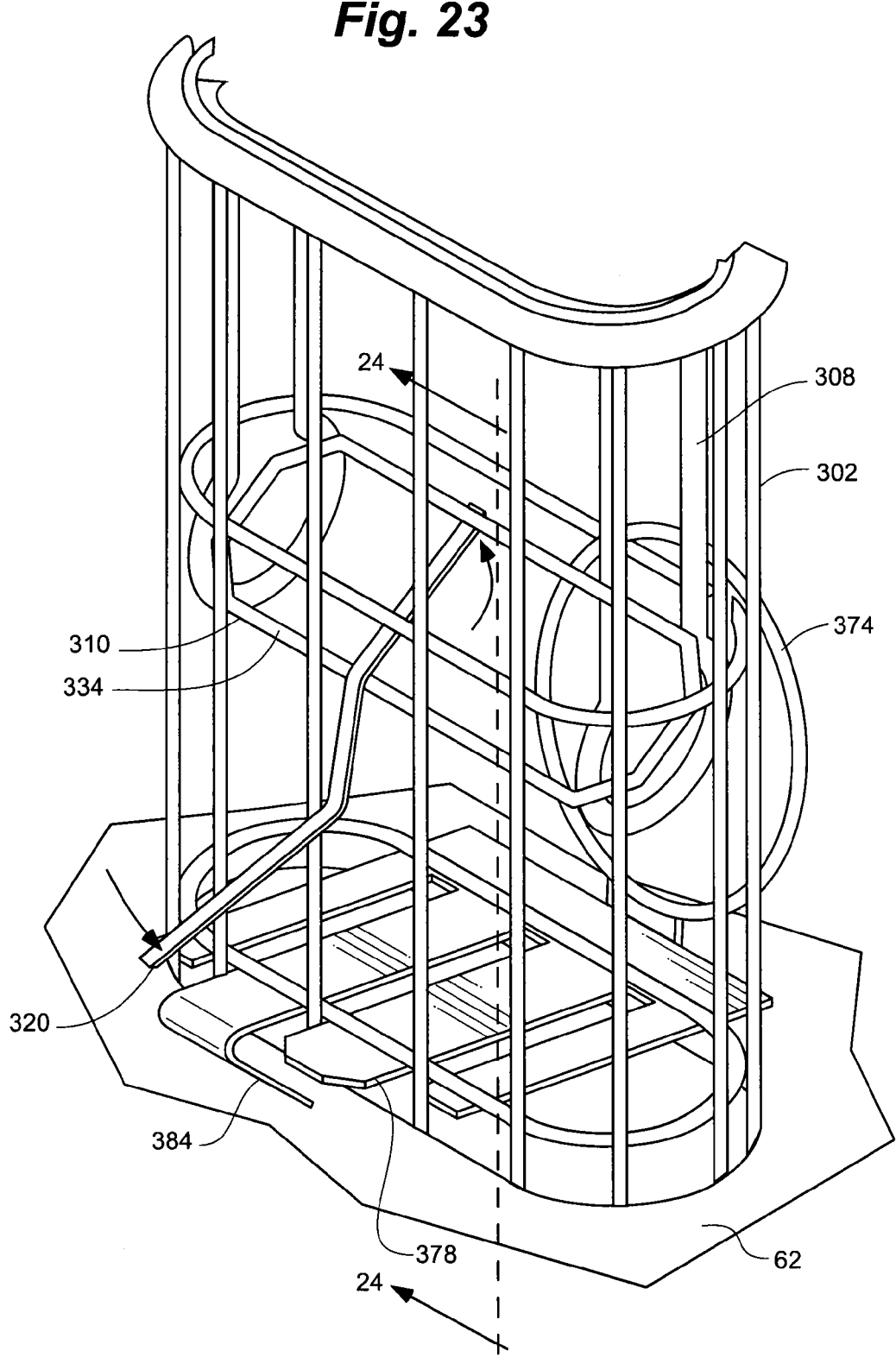
FIG. 23 is a perspective view of a filter cage support, installation tool and filter cage lock loss protector in use in accordance with an embodiment of the invention.

Referring to FIGS. 19 and 20, linear clip cage lock 330 generally includes channel portion 364, curve legs 366 and wire guide receivers 368. Box or channel portion 364 may be formed of steel or aluminum channel, square section tubing or a solid bar for example. Curved legs 366 in cooperation with wire guide receivers 368 are dimensioned to receive the wires of wire guides 308 or a portion of sheet metal sleeve 304 when installed. In one example embodiment, linear clip cage lock 330 may be hingedly secured to one of wire guides 308 or sheet metal sleeves 304.

Figure 16:
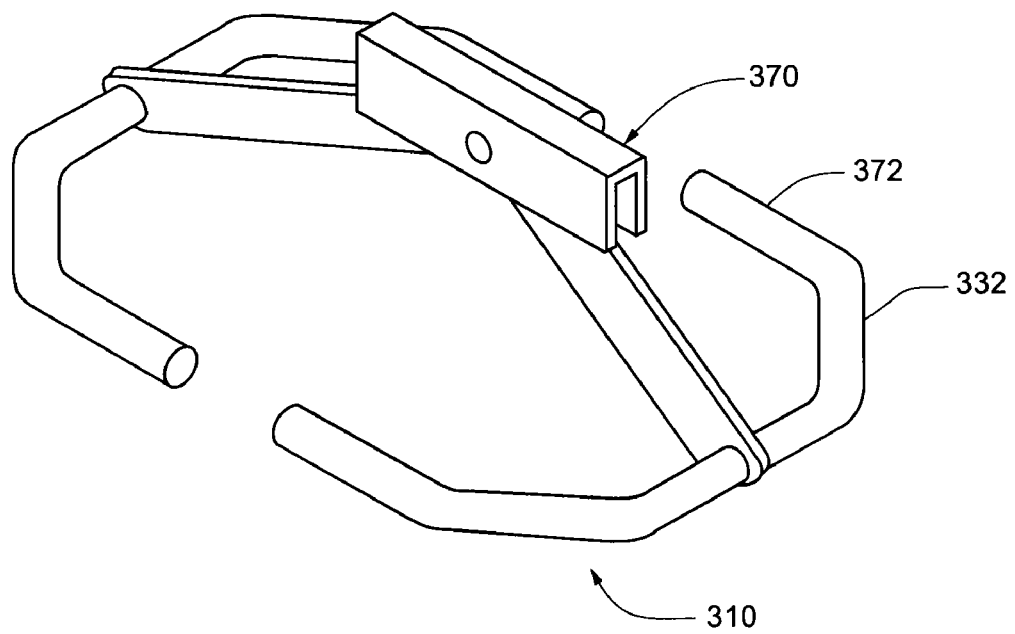
FIG. 16 is a perspective view of an over center filter cage lock in accordance with an embodiment of the invention.

Referring to FIG. 16, over-center cage lock 332 generally includes over-center mechanism 370 and contact portions 372. Over-center mechanism 370 is structured to expand contact portions 372 into contact with sheet metal sleeves 304 or wire guides 308.

Any of the various embodiments of cage lock 310 may be utilized to secure either wire guides 308 or sheet metal sleeves 304 in the context of coupling first section 300 with second section 302 of filter cage 54.

Referring to FIGS. 21 and 23-26, filter cage support and lock loss protector 374, in an example embodiment, generally includes handle 376, fingers 378 and cross member 380. Handle 376 is depicted here as being circular but can be of any shape convenient for the purpose. Fingers 378 are positioned to define slots 382 therebetween. Fingers 378 are structured to fit through open portions of filters cage 54. Optionally, fingers 378 may include at least one bent finger 384. Bent finger 384 is adapted to prevent the unintended withdrawal of loss protector 374 from within a filter cage by engaging one of annular members 314.

As depicted in FIGS. 23-26, loss protector 374 assists in supporting filter cage 54 while cage lock 310 is installed or removed. Loss protector 374 also assists by reducing the likelihood that cage lock 310 can fall down the length of filter cage 54 to the bottom of filter bag 52, thus becoming difficult to retrieve.

Referring to FIGS. 5, 6a, 6b, 9 and 22, installation tool 320 generally includes handle portion 386 and curved end 388. Curved end 388 is adapted to grip cage lock 310 to assist in positioning it.

In operation, referring to FIGS. 4, 5, 6a, 6b, 7, 8 and 9, rotating cage lock 324 is inserted between wire guides 308 or sheet metal sleeves 304. Rotating cage lock 324 is then rotated by hand or with the assistance of installation tool 320 into a position generally perpendicular to the longitudal axis of wire filter cage 54. Rotating cage lock 324 then resists or inhibits inward deflection of sheet metal sleeves 304 or wire guides 308, thus providing a coupling between first section 300 and second section 302 that is highly resistance to impulse loads under tension. Thus, the application of cage lock 310 prevents the unintended separation of first section 300 from second section 302, thus preventing damage to filter bags and filter cages. As discussed above, unintended separation of first section 300 from second section 302 can occur when filter cage 54 is subjected to dropping.

Referring to FIG. 13, in operation, turnbuckle cage lock 326 is inserted between sheet metal sleeves 304 or wire guides 308. Turnbuckle 352 is then rotated to force contact portions 354 outward against sheet metal sleeves 304 or wire guides 308, thus inhibiting inadvertent separation of first section 300 from second section 302 under load.

Referring to FIGS. 17 and 18, bent clip cage lock 328 is inserted between sheet metal sleeves 304 or wire guides 308 to prevent inward deflection of sheet metals sleeves 304 or wire guides 308, thus securing first section 300 to second section 302 against tensions loads.

Referring to FIGS. 19 and 20, linear clip cage lock 330 is inserted between sheet metal sleeves 304 or wire guides 308 to prevent inward deflection of sheet metals sleeves 304 or wire guides 308.

To accommodate linear clip cage lock 330, sheet metal sleeves 304 may have apertures cut in them to receive linear clip cage lock 330. In one example embodiment, linear clip cage lock 330 may be attached to one of wire guides 308 by bending one of curved legs 366 around wire guide 308. Thus, linear clip cage lock 330 may be hingedly attached to one of wire guides 308 or sheet metal; sleeves 304.

Over-center cage lock 332 may be inserted between sheet metal sleeves 304 or wire guides 308 and over-center mechanism 370 actuated to force contact portions 372 outward into wire guides 308 or sheet metal sleeves 304, thus preventing inward deflection of wire guides 308 or sheet metals sleeves 304 to secure first section 300 to second section 302.

Figure 24:
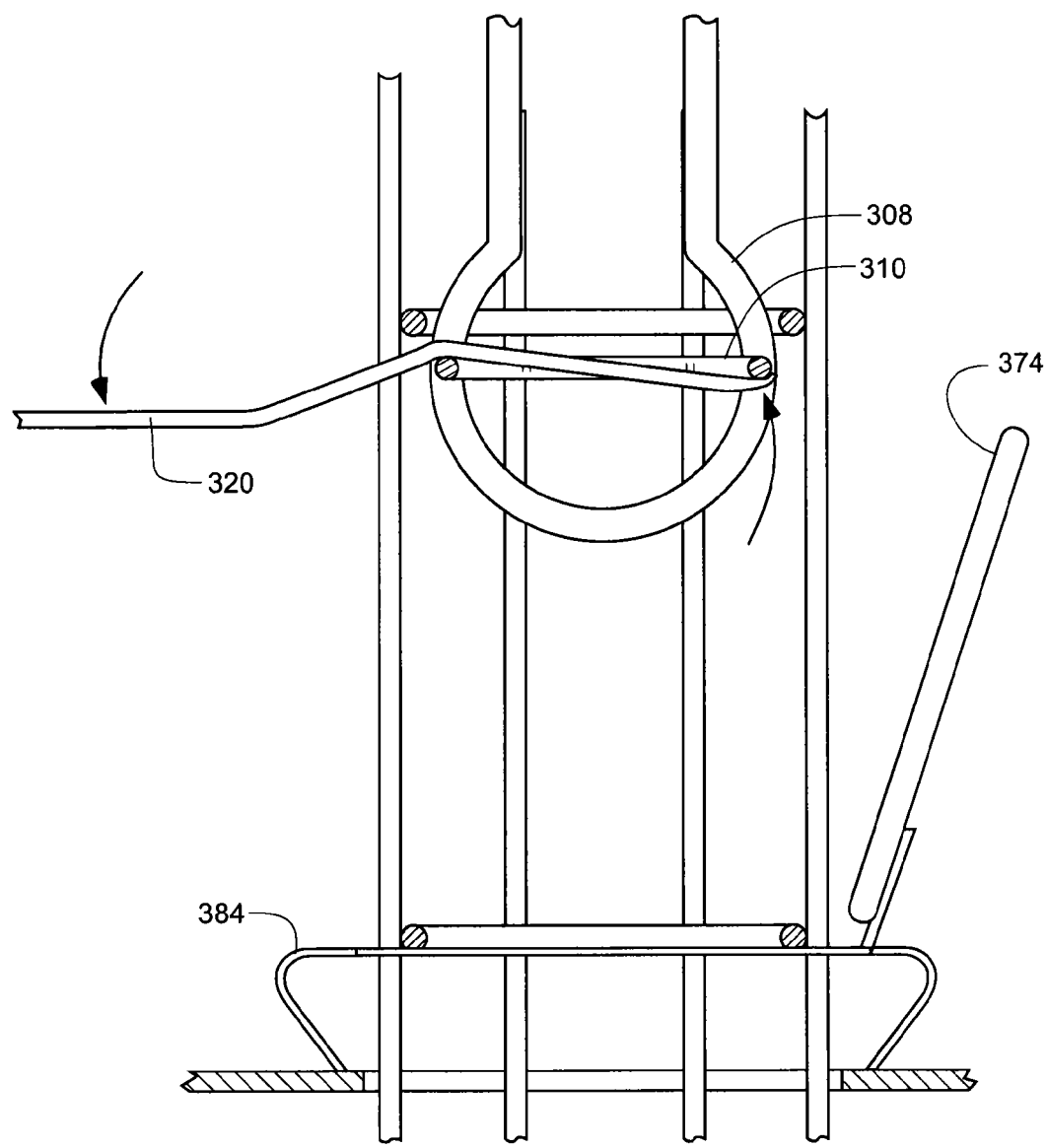
FIG. 24 is a cross sectional view of a filter cage support, installation tool and filter cage lock loss protector in use taken along section line 24-24 of FIG. 23 in accordance with an embodiment of the invention.
Figure 25:
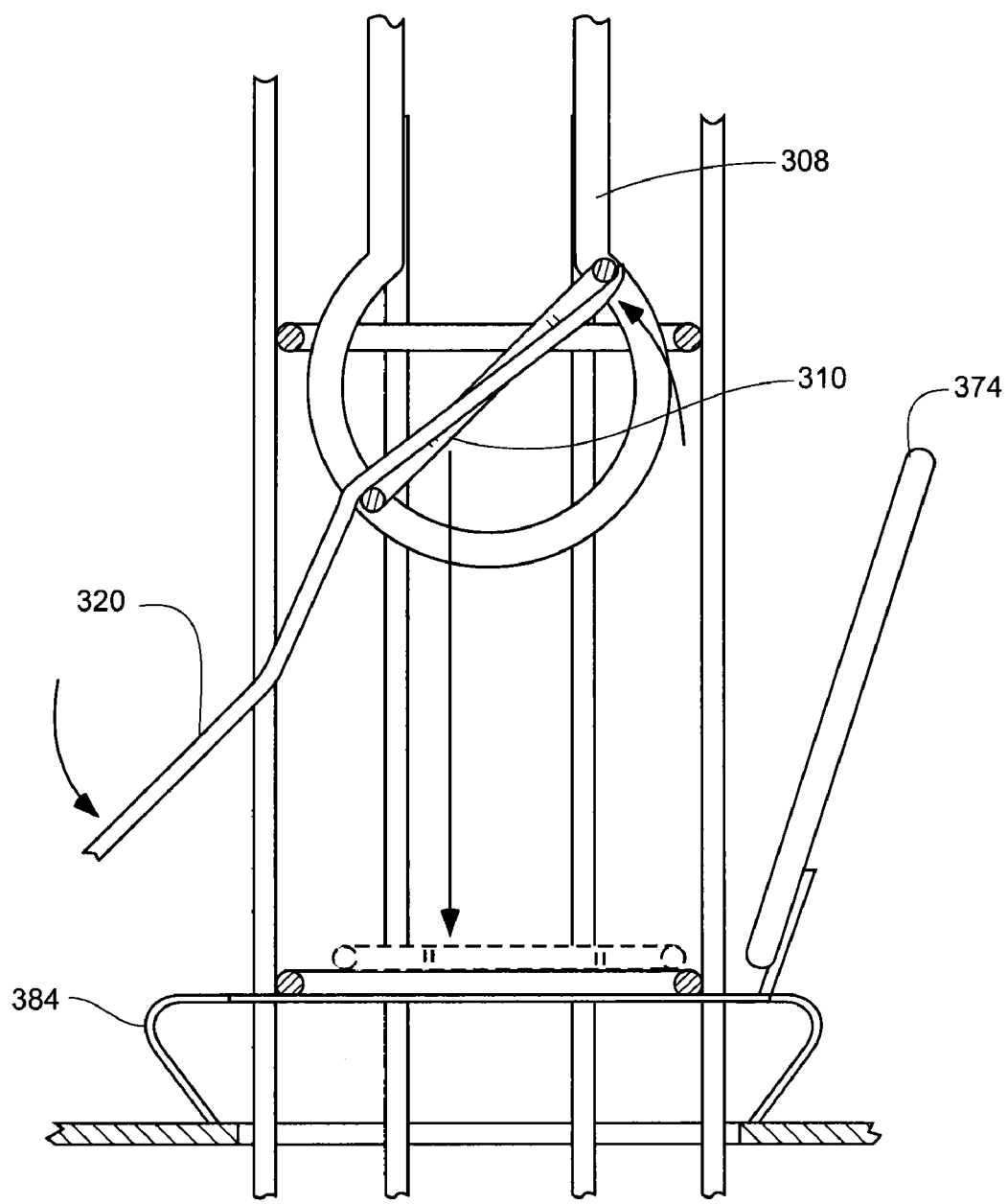
FIG. 25 is a cross sectional view of the filter cage support, installation tool and filter cage lock loss protector in use showing the loss protector stopping the loss of the filter cage lock in accordance with an embodiment of the invention.
Figure 26:
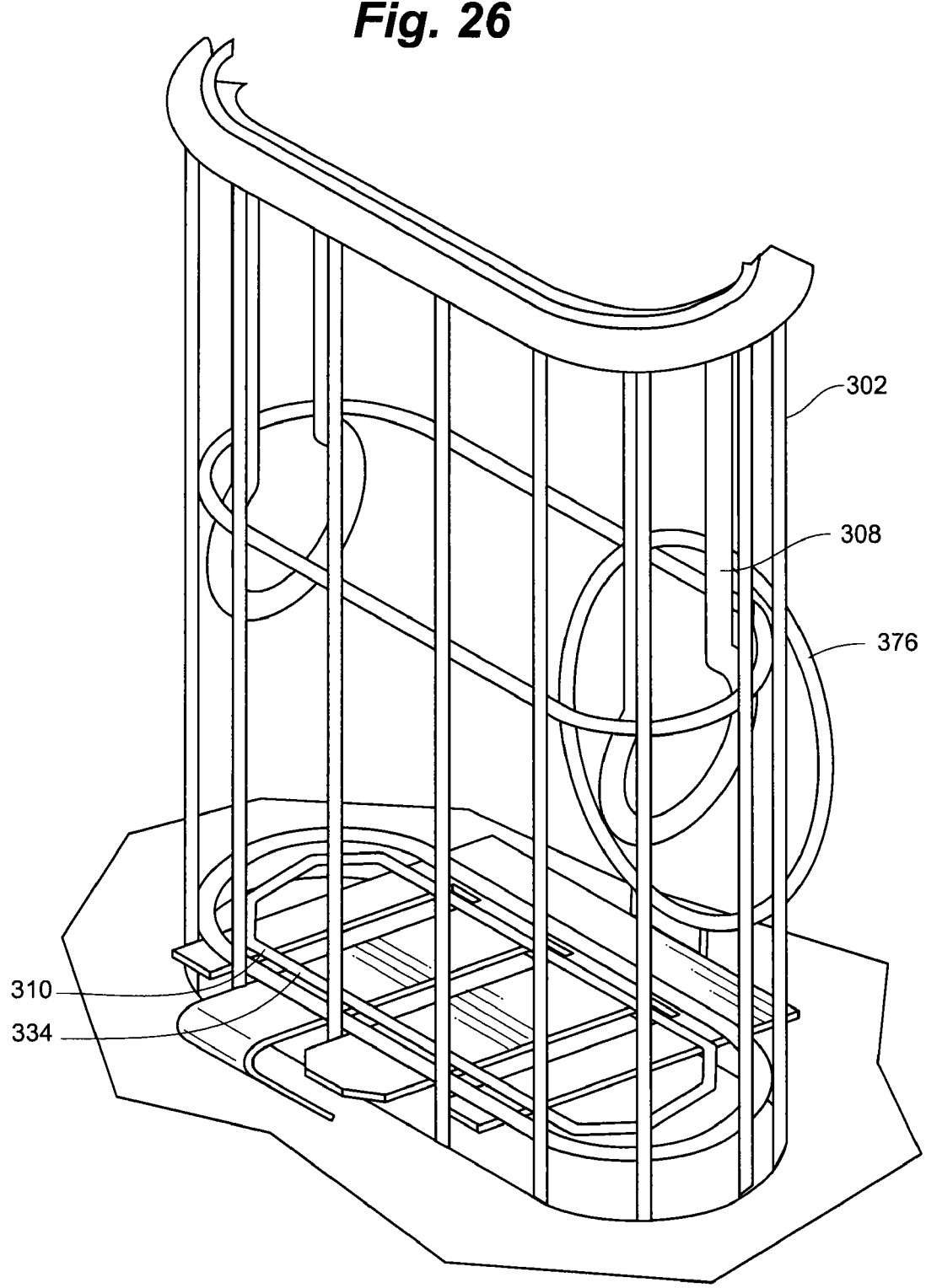
FIG. 26 is a perspective view of the filter cage support, installation tool and filter cage lock loss protector in use showing the loss protector stopping the loss of the filter cage lock in accordance with an embodiment of the invention.

Referring to FIGS. 21 and 23-26, filter cage support and lock loss protector 374 can be inserted between longitudinal members 312 of filter cage 54 and abutting one of annular members 314, thus preventing filter cage 54 from dropping through hanger deck 62. As depicted in FIGS. 24 through 26, loss protector 374 inhibits cage locks 310 from falling down filter cage 54.

Figure 27:
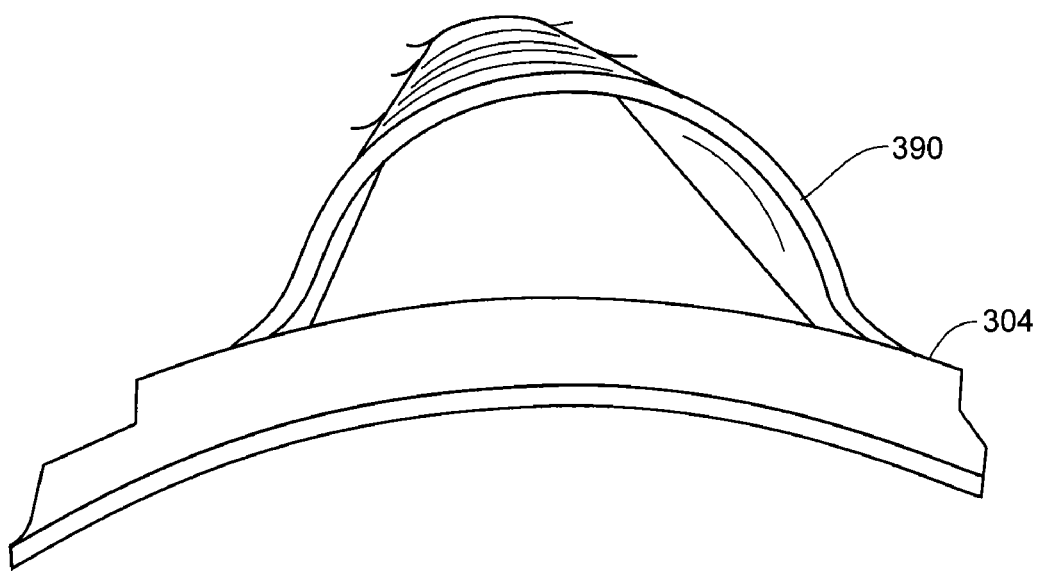
FIG. 27 is a perspective view of an engagement dimple in a sheet metal sleeve in accordance with an embodiment of the invention.

Referring to FIG. 27, engagement dimples 322 may be formed as punch dimple 390 by applying a punch partially through sheet metal sleeves 304.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A filter bag support structure, comprising:
    a first section and a second section;
    the first section including a pair of opposed alignment members located partially internal to the first section and extending outwardly away from the first section, the alignment members being aligned to insert into the second section;
    the second section including at least one annular member therein;
    the alignment members being receivable within the second section and having engagement members near a distal end thereof, the engagement members being receivable into the at least one annular member; and
    a locking member that is removably insertable between the opposed alignments members, the locking member inhibiting the alignment members from flexing inwardly when locking member is inserted between the alignment members, wherein the alignment members resist being removed from the at least one annular member when a tension load is applied that would tend to separate the first section from the second section to a greater degree when the locking member is inserted than when the locking member is not present.

2. The filter bag support structure as claimed in claim 1, wherein the alignment members comprise metal sleeves presenting at least one engagement dimple.

3. The filter bag support structure as claimed in claim 1, wherein the alignment members comprise wire guides.

4. The filter bag support structure as claimed in claim 1, wherein the locking member comprises a rotating locking member that is insertable between the opposed alignment members the rotating locking member being rotatably shiftable between a first orientation wherein the rotating locking member is not secured between the opposed alignment members and a second orientation wherein the rotating locking member is secured between the opposed alignment members.

5. The filter bag support structure as claimed in claim 4, wherein the rotating locking member has a shape selected from a group consisting of oval, race track shaped, polygonal, dome ended and dog bone shaped.

6. The filter bag support structure as claimed in claim 1, wherein the locking member comprises turnbuckle.

7. The filter bag support structure as claimed in claim 1, wherein the locking member comprises an over-center mechanism.

8. The filter bag support structure as claimed in claim 1, wherein the locking member comprises a bent clip including a first leg and a second leg, each of the first leg and the second leg present an indentation to engage one of the opposed alignment members.

9. The filter bag support structure as claimed in claim 1, wherein the locking member comprises a linear clip including a central linear portion and curved legs and presenting two receiving portions, each receiving portion to engage one of the opposed alignment members.

10. The filter bag support structure as claimed in claim 9, wherein the linear clip is hingedly secured to one of the alignment members.

11. A filter bag support system, comprising:
    a filter bag support structure including a first section and a second section;
    the first section including a pair of opposed alignment members located partially internal to the first section and extending outwardly away from the first section, the alignment members being aligned to insert into the second section;
    the second section including at least one annular member therein;
    the alignment members being receivable within the second section and having engagement members near a distal end thereof, the engagement members being receivable into the at least one annular member;
    a locking member that is removably insertable between the opposed alignment members, the locking member inhibiting the alignment members from flexing inwardly when locking member is inserted wherein the alignment members resist being removed from the at least one annular member when a tension load is applied that would tend to separate the first section from the second section to a greater degree when the locking member is inserted than when the locking member is not present; and
    a filter bag support structure support and lock loss preventer insertable through the filter support structure, the support and lock loss preventer at least partially blocking an interior of the filter bag support structure across a cross section thereof and inhibiting passage of the filter bag support structure through an opening in a horizontal partition plate.

12. The filter bag support system, as claimed in claim 11, wherein the filter bag support structure support and lock loss preventer comprises several fingers sized to pass through reticulated openings in the filter bag support structure substantially perpendicular to a long axis of the filter bag support structure.

13. The filter bag support system, as claimed in claim 11, wherein at least one of the several fingers comprises a bent finger that engages the horizontal partition plate.

14. The filter bag support system, as claimed in claim 11, wherein the alignment members comprise metal sleeves.

15. The filter bag support system, as claimed in claim 11 wherein the alignment members comprise wire guides.

16. The filter bag support system, as claimed in claim 11, wherein the locking member comprises a rotating locking member that is insertable between the opposed alignment members the rotating locking member being rotatably shiftable between a first orientation wherein the rotating locking member is not secured between the opposed alignment members and a second orientation wherein the rotating locking member is secured between the opposed alignment members.

17. The filter bag support system, as claimed in claim 11, wherein the rotating locking member has a shape selected from a group consisting of oval, race track shaped, polygonal, dome ended and dog bone shaped.

18. The filter bag support system, as claimed in claim 11, wherein the locking member comprises turnbuckle.

19. The filter bag support system, as claimed in claim 11, wherein the locking member comprises an over-center mechanism.

20. The filter bag support system, as claimed in claim 11, wherein the locking member comprises a bent clip including a first leg and a second leg, each of the first leg and the second leg present an indentation to engage one of the opposed alignment members.

21. The filter bag support system, as claimed in claim 11, wherein the locking member comprises a linear clip including a central linear portion and curved legs and presenting two receiving portions, each receiving portion to engage one of the opposed alignment members.

22. The filter bag support structure as claimed in claim 9, wherein the linear clip is hingedly secured to one of the alignment members.

* * * * *